US009982068B2

(12) United States Patent
Gavvalapalli et al.

(10) Patent No.: US 9,982,068 B2
(45) Date of Patent: May 29, 2018

(54) REDOX ACTIVE POLYMERS AND COLLOIDAL PARTICLES FOR FLOW BATTERIES

(71) Applicant: The Board of Trustees of the University of Illinois, Urbana, IL (US)

(72) Inventors: Nagarjuna Gavvalapalli, Urbana, IL (US); Jeffrey S. Moore, Savoy, IL (US); Joaquin Rodriguez-Lopez, Urbana, IL (US); Kevin Cheng, Urbana, IL (US); Mei Shen, Urbana, IL (US); Timothy Lichtenstein, Carol Stream, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 47 days.

(21) Appl. No.: 15/000,910

(22) Filed: Jan. 19, 2016

(65) Prior Publication Data
US 2016/0208030 A1 Jul. 21, 2016

Related U.S. Application Data

(60) Provisional application No. 62/104,329, filed on Jan. 16, 2015.

(51) Int. Cl.
| | |
|---|---|
| H01M 8/18 | (2006.01) |
| H01M 8/20 | (2006.01) |
| C08F 112/14 | (2006.01) |
| H01M 8/02 | (2016.01) |
| C08F 12/26 | (2006.01) |
| C08F 12/32 | (2006.01) |
| C08F 212/14 | (2006.01) |
| C08F 8/30 | (2006.01) |

(52) U.S. Cl.
CPC .............. *C08F 112/14* (2013.01); *C08F 8/30* (2013.01); *C08F 12/26* (2013.01); *C08F 12/32* (2013.01); *C08F 212/14* (2013.01); *H01M 8/02* (2013.01); *H01M 8/188* (2013.01); *H01M 8/20* (2013.01); *H01M 2300/0025* (2013.01); *H01M 2300/0028* (2013.01); *Y02E 60/528* (2013.01)

(58) Field of Classification Search
CPC ........ H01M 2/188; H01M 2/20; C08F 112/14
See application file for complete search history.

(56) References Cited

U.S. PATENT DOCUMENTS

| | | | | |
|---|---|---|---|---|
| 9,123,923 | B2 * | 9/2015 | Zhang ....................... | C08J 5/22 |
| 2011/0104574 | A1 * | 5/2011 | Shembel ............. | H01M 10/052 |
| | | | | 429/310 |
| 2013/0224538 | A1 | 8/2013 | Jansen et al. | |
| 2014/0099569 | A1 | 4/2014 | Oh et al. | |
| 2015/0207165 | A1 | 7/2015 | Schubert et al. | |
| 2015/0228950 | A1 | 8/2015 | Moon et al. | |
| 2015/0335783 | A1 * | 11/2015 | Kohn .................... | A61K 31/138 |
| | | | | 600/431 |
| 2015/0372333 | A1 | 12/2015 | Odom et al. | |

FOREIGN PATENT DOCUMENTS

| | | | |
|---|---|---|---|
| JP | 61-151214 | * | 7/1986 |
| WO | 2014026728 A1 | | 2/2014 |

OTHER PUBLICATIONS

Machine translation of 61-151214, published on Jul. 9, 1986.*
Burgess, M., et al., "Scanning Electrochemical Microscopy and Hydrodynamic Voltammetry Investigation of Charge Transfer Mechanisms on Redox Active Polymers," J Electrochem Soc, 163(4):H3006-H3013, 2016.
Gong, K., et al., "Nonaqueous Redox-Flow Batteries: Organic Solvents, Supporting Electrolytes, and Redox Pairs," Energy Environ. Sci., 12:3515-3530, Dec. 2015.
Janoschka, T., et al., "An Aqueous, Polymer-Based Redox-Flow Battery using Non-Corrosive, Safe, and Low-Cost Materials," Nature, 527(5):78-93, Nov. 2015.
Oh, S.H., et al., "A Metal-Free and All-Organic Redox Flow Battery with Polythiophene as the Electroactive Species," J. Mater. Chem. A, 2:19994-19998, Dec. 2014.
Winsberg, J., et al., "Polymer/Zinc Hybrid-Flow Battery Using Block Copolymer Micelles Featuring TEMPO Corona as Catholyte," Adv. Mater, 9:1-6, Mar. 2016.
Brushett et al., "An All-Organic Non-aqueous Lithium-Ion Redox Flow Battery", Advanced Energy Materials (May 15, 2012) 2: 1390-1396.
Darling et al., "Pathways to low cost electrochemical energy storage: a comparison of aqueous and nonaqueous flow batteries", Energy and Environmental Science, The Royal Society of Chemistry (Sep. 16, 2014) 7: 3459-3477.

(Continued)

*Primary Examiner* — Anca Eoff
(74) *Attorney, Agent, or Firm* — Haukaas Fortius PLLC; Michael H. Haukaas

(57) ABSTRACT

The invention provides a redox flow battery comprising a microporous or nanoporous size-exclusion membrane, wherein one cell of the battery contains a redox-active polymer dissolved in the non-aqueous solvent or a redox-active colloidal particle dispersed in the non-aqueous solvent. The redox flow battery provides enhanced ionic conductivity across the electrolyte separator and reduced redox-active species crossover, thereby improving the performance and enabling widespread utilization. Redox active poly (vinylbenzyl ethylviologen) (RAPs) and redox active colloidal particles (RACs) were prepared and were found to be highly effective redox species. Controlled potential bulk electrolysis indicates that 94-99% of the nominal charge on different RAPs is accessible and the electrolysis products are stable upon cycling. The high concentration attainable (>2.0 M) for RAPs in common non-aqueous battery solvents, their electrochemical and chemical reversibility, and their hindered transport across porous separators make them attractive materials for non-aqueous redox flow batteries based on size-selectivity.

22 Claims, 16 Drawing Sheets

(56) References Cited

OTHER PUBLICATIONS

Niagarjuna et al., "Impact of Redox-Active Polymer Molecular Weight on the Electrochemical Properties and Transport Across Porous Separators in Nonaqueous Solvents", Journal of the American Chemical Society (Oct. 17, 2014) 136: 16309-16316.
Shin et al., "A review of current developments in non-aqueous redox flow batteries: characterization of their membranes for design perspective", RSC Advances, The Royal Society of Chemistry (Feb. 15, 2013) 3: 3095-9116.
Wei et al., "Nanoporous Polytetrafluoroethylene/Silica Composite Separator as a High-Performance All-Vanadium Redox Flow Battery Membrane", Advanced Energy Materials (May 2, 2013) 3: 1215-1220.
Wei et al., "Polyvinyl Chloride/Silica Nanoporous Composite Separator for All-Vanadium Redox Flow Battery Applications", Journal of the Electrochemical Society (May 24, 2013) 160(8): A1215-A1218.
Wang et al., "Li-Redox Flow Batteries Based on Hybrid Electrolytes: At the Cross Road between Li-ion and Redox Flow Batteries", Advanced Energy Materials (Jun. 4, 2012) 2: 770-779.
Zhang et al., "Nanofiltration (NF) membranes: the next generation separators for all vanadium redox flow batteries (VRBs)?", Energy and Environmental Science, The Royal Society of Chemistry (Apr. 1, 2011) 4: 1676-1679.

\* cited by examiner

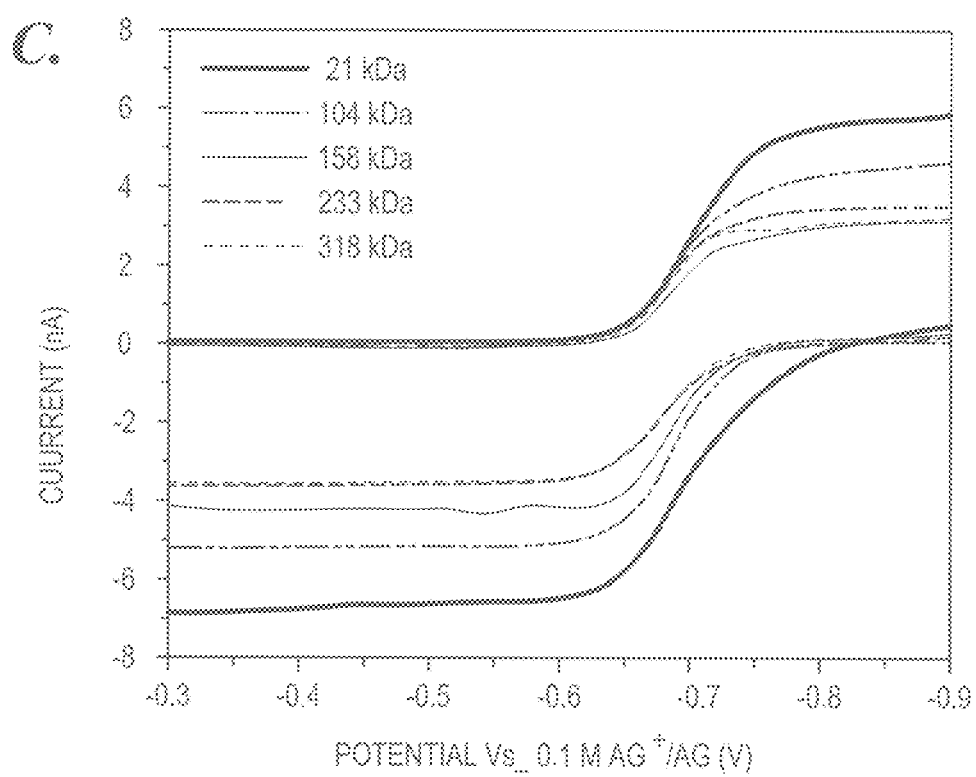
*FIG. 1 - Continued*

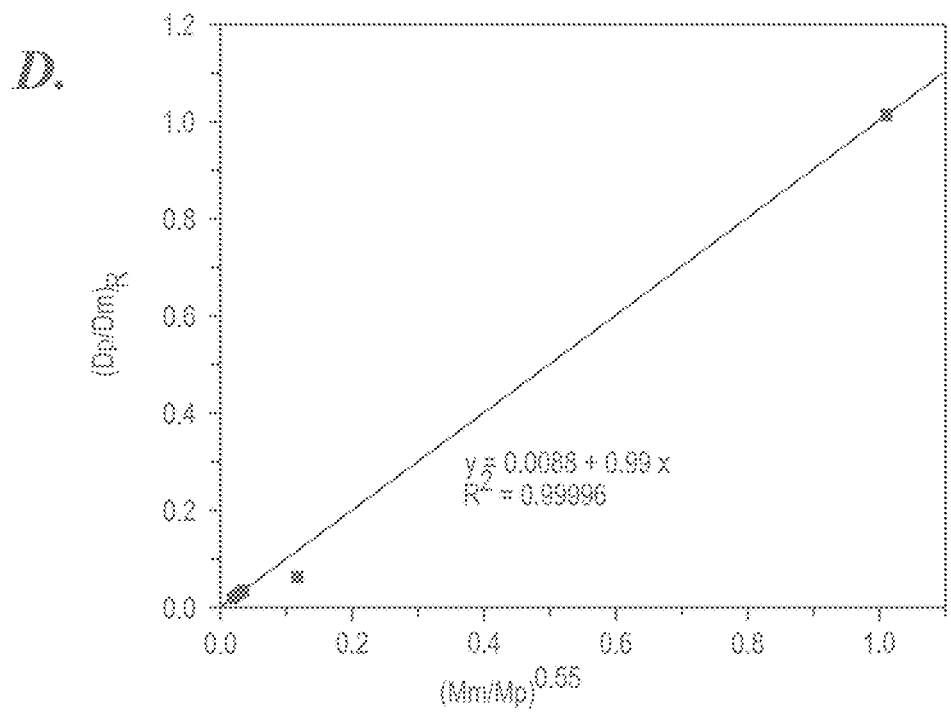
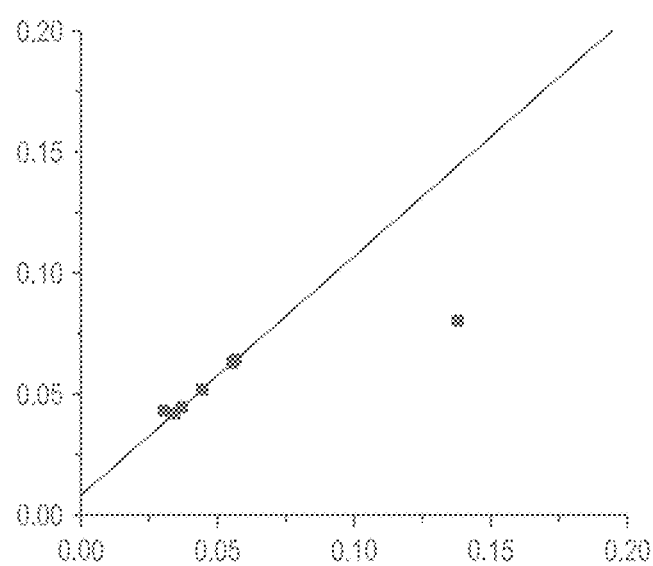
FIG. 1 - Continued

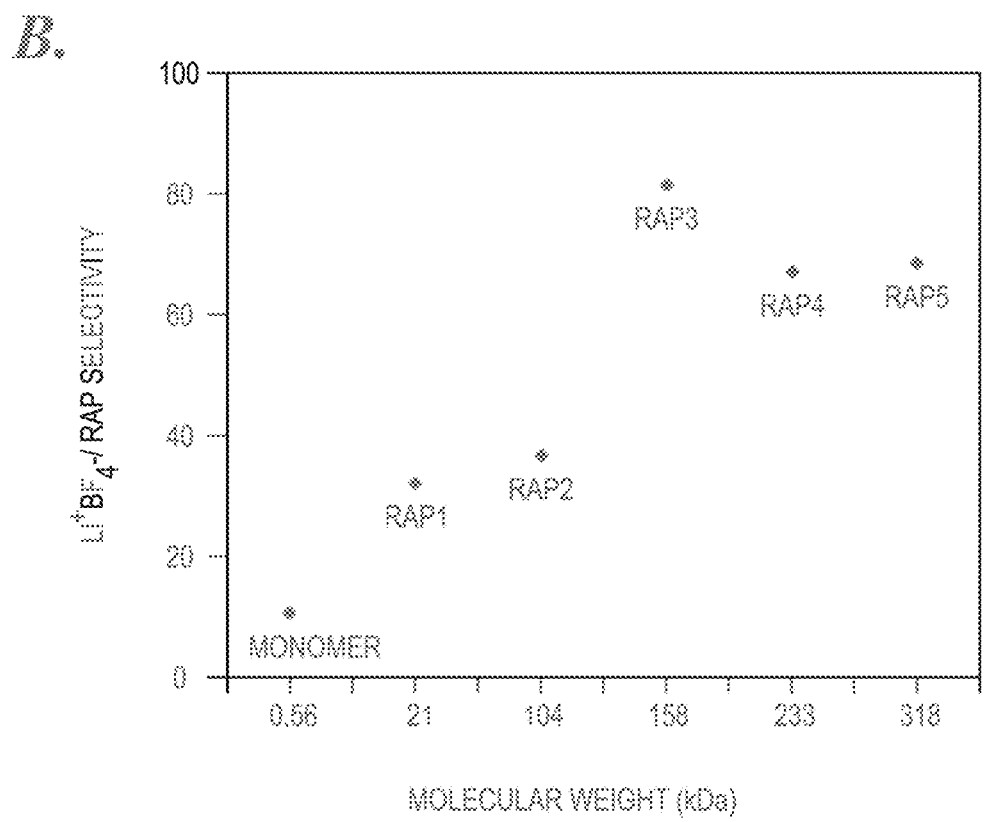
FIG. 4 - Continued

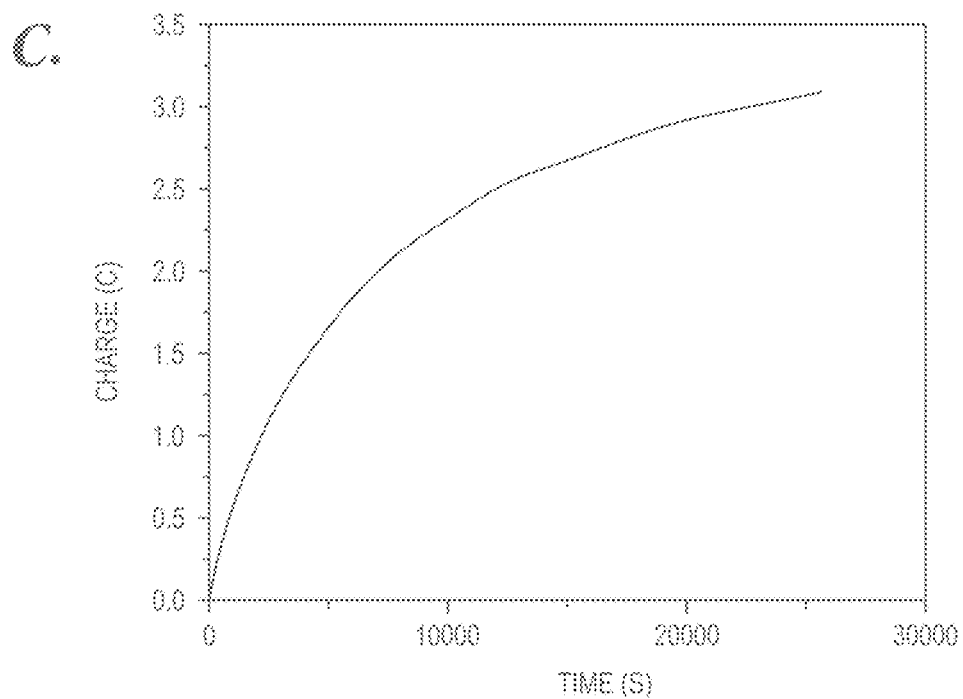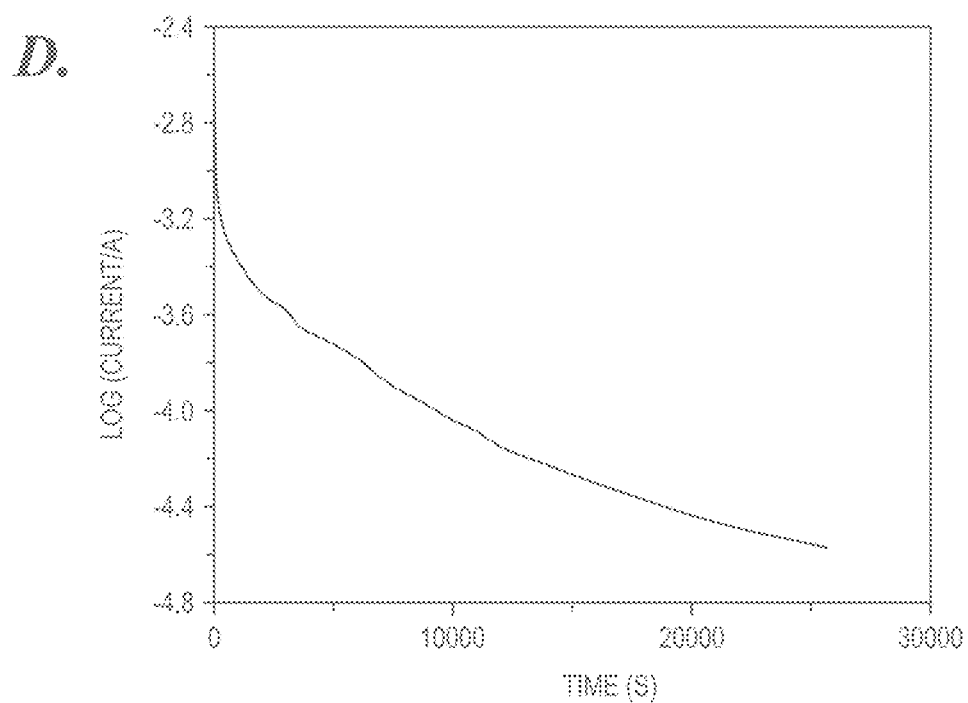
FIG. 9 - Continued

REDOX ACTIVE POLYMERS AND COLLOIDAL PARTICLES FOR FLOW BATTERIES

RELATED APPLICATIONS

This application claims priority under 35 U.S.C. § 119(e) to U.S. Provisional Patent Application No. 62/104,329, filed Jan. 16, 2015, which is incorporated herein by reference.

GOVERNMENT SUPPORT

This invention was made with government support under contract number DE-AC02-06CH11357 awarded by the Department of Energy. The government has certain rights in the invention.

BACKGROUND OF THE INVENTION

Redox flow battery technology offers many advantages for grid energy storage such as load-leveling, long durability, flexible operation, easy scalability, high-efficiency and low cost. In this technology, electrochemical energy is stored in highly concentrated solutions of reversible redox active molecules, and separated in compartments for the low and high electrochemical potential species. Non-aqueous redox flow batteries (NRFBs) are a potentially viable alternative to their aqueous counterparts (ARFBs) having a wide range of redox active species and electrolytes available for their design. The energy density of NRFBs can be dramatically increased by using redox couples that are highly soluble in organic solvents and that operate at electrode potentials well beyond the window of stability of aqueous electrolytes. Despite these exciting prospects, the lower ionic conductivity observed in non-aqueous electrolytes has prevented the wide-scale development of NRFBs.

Challenges in adapting commonly used ion exchange membranes (IEMs) as separators from aqueous to non-aqueous environments are greatly responsible for the paucity in studies of NRFBs. The role of the separator is to physically and electronically isolate the high and low potential redox species compartments. This prevents the mixing of the redox active components (crossover) and simultaneously provides high electrolyte ionic conductivity for minimizing losses due to resistance to current flow. Using IEMs designed for aqueous environments, many of which are proton conductors, decreases the power density of NRFBs by one order of magnitude compared to ARFBs. Moreover, IEMs are expensive and they contribute to ~20% of the battery cost.

Finding improvements in the performance of IEM's is an active research area, but an alternative membrane for NRFBs based on electrolyte size-selectivity rather than ionic-selectivity could be significantly beneficial. Size-selectivity using nano-porous membranes has been introduced recently in aqueous vanadium redox flow batteries for separating proton transport from that of larger vanadium cations. A strong emphasis is placed on the complex design of these membranes so they can adjust their sterics and electrostatics to effectively discriminate the redox active species, however this adds to the cost and complexity of the device. Accordingly, there is an ongoing need for new, more efficient, redox flow batteries. For example, an alternate approach in which the size of the redox active species is varied through a chemically-flexible synthetic polymer approach is needed in the art. Such a new strategy would de-emphasize membrane design and enable an insightful exploration of the properties of potential redox active candidates.

SUMMARY

Current non-aqueous redox flow batteries typically have lower power and current density than aqueous redox flow batteries. Crossover of redox active particles through the separating membrane of non-aqueous redox flow batteries lowers the power and current densities and affects the overall performance of the battery by enabling Coulombic losses. The invention provides an improved non-aqueous redox flow battery with reduced crossover of redox active particles. The non-aqueous redox flow battery described herein provides a size exclusion membrane that allows counter ions to pass through but prevent or substantially prevents the crossover of the redox active polymers and colloidal particles. The synthetic redox active species allows for the tuning of crossover characteristics, flow and hydrodynamic characteristics, and charge/discharge performance based on the size of the redox active particles. When combined with a size exclusion membrane, these polymers can be used without significant crossover between cells allowing flow cells to increase redox active species concentration while also increasing energy density, power and efficiency.

The invention therefore provides a redox flow battery comprising a first and a second chamber separated by a microporous or nanoporous size-exclusion membrane, wherein the first and second chambers each contain a non-aqueous solvent, a charge balancing ion, and an electrode. In some cases, the charge balancing ion can originate from the redox material in addition to the ions of a dissolved supporting electrolyte in one or both chambers. The first chamber contains a redox-active viologen-based polymer dissolved in the non-aqueous solvent, or a viologen-based colloidal particle suspended in the non-aqueous solvent, or a combination thereof, wherein the viologen-based polymer, when present, has a molecular weight of at least about 15 kDa, and the colloidal particles, when present, have an average diameter of about 2 nm to about 3000 nm.

In some embodiments, the colloidal particles have an average diameter of about 50 nm to about 900 nm, or about 100 nm to about 1000 nm. In various embodiments, the redox active polymer is a ferrocenyl-based polymer, nitrobenzene-based polymer, isonicotinate-based polymer, quinoxaline-based polymer, N,N,N',N'-tetramethyl-p-phenylenediamine-based polymer, dimethoxy benzene-based polymer, where a based polymer based on a particular moiety is a polymer backbone covalently linked to a plurality of the moieties, thereby making the polymer a redox active polymer.

In one specific embodiment, the first chamber contains a viologen-based polymer is a polymer of Formula I:

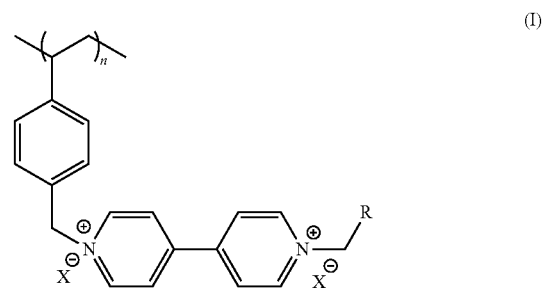

wherein
each X⁻ is a suitable anion;
R is H, alkyl, alkyl(aryl), or alkyl-alkoxy; and
n is sufficient to provide a polymer wherein n is such that the molecular weight ($M_n$) of the polymer is about 10 kDa to about 500 kDa. In other embodiments, the first chamber contains a viologen-based polymer having a polyacrylate, polymetacrylate, polynorbornene, or polyacrylamide polymer chain, wherein the viologen is linked to the polymer backbone through a functional group of the monomers of the polymer.

In various embodiments, the molecular weight ($M_n$) of the polymer can be about 15 kDa to about 500 kDa, about 15 kDa to about 350 kDa, about 18 kDa to about 350 kDa, about 20 kDa to about 350 kDa, about 100 kDa to about 200 kDa, about 200 kDa to about 350 kDa, or about 300 kDa to about 500 kDa. The viologen-based polymer is dissolved in the non-aqueous solvent to a concentration of greater than 1M, for example, about 2M, or about 3M.

In some embodiments, the crossover of the redox active polymer is less than 20%, for example, at 24 hours of battery performance. In other embodiments, the crossover of the redox active polymer can be less than about 16%, or less than about 10%.

In some embodiments, the first chamber contains a viologen-based polymeric particle prepared from polyvinylbenzyl chloride crosslinked with divinylbenzene, wherein greater than 80% of the chloride groups of the polyvinylbenzyl chloride have been displaced with an alkyl viologen, wherein the polymeric particle has an average diameter of at least about 2 nm, at least about 20 nm, or at least about 50 nm. The polymeric particle can be in a colloidal suspension or dispersion in the first chamber. This high substitutional yield (>80%) provides highly active redox polymers and particles, and more redox active than known species.

In some embodiments, the polymeric particle has a diameter of about 50 nm to about 200 nm. In other embodiments, the polymeric particle has a diameter of about 500 nm to about 1000 nm, or about 1000 nm to about 3000 nm. The crossover of the redox active polymeric particle can be less than 0.05% at 24 hours of operation (e.g., for a nanoporous separator), where the crossover is dependent upon the pore size of the separator. In some embodiments, the separator has a size exclusion limit of larger than 1.5 kDa. For larger particles, e.g., particles of 900 nm diameter or greater, a microporous separator can be used, with similar low crossover. Larger pores can be useful in a redox flow battery because they prevent loss of power, whereas smaller pores can impede current flow and reduce electrolyte transport, resulting in lower power.

In various embodiments, the charge balancing ion comprises $Li^+$, $Na^+$, $K^+$, $Mg^{+2}$, $Ca^{+2}$, or $NH_4^+$, or $NR_4^+$ wherein each R is independently H, alkyl, aryl, or pyridinium. The first and second chambers can contain an electrolyte solution comprising anions selected from $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, $B_{12}X_6H_{(12-n)}^{2-}$, and $X^-$, wherein X is a halogen.

The non-aqueous solvent can be acetonitrile, ethylenecarbonate, propylenecarbonate, butylenecarbonate, dimethylcarbonate, diethylcarbonate, dipropylcarbonate, ethylmethylcarbonate, fluoroethylenecarbonate, gamma-butyrolactone, N-methyl-2-pyrrolidone, N,N-dimethylformamide, N,N-dimethylacetamide, dimethylsulfoxide, dichloromethane, chloroform, benzene, toluene, xylene, chlorobenzene, nitrobenzene, methylacetate, ethylacetate, acetone, methylethylketone, cyclohexanone, diethylether, 1,2-dimethoxyethane, tetraethyleneglycoldimethylether, bis(2-methoxyethyl)ether, tetrahydrofuran, 1,4-dioxane, methanol, ethanol, or a combination of two or more of the foregoing solvents.

The pores of the size-exclusion membrane can be at least about 10 nm in diameter up to about 1000 nm in diameter. In some embodiments, the pores of the size-exclusion membrane are about 20 nm in diameter to about 50 nm in diameter. In various embodiments, the $r_{poly}/r_{pore}$ (polymer solvodynamic size relative to separator pore size) values are >0.3.

It was surprisingly discovered that greater than 93% of the nominal viologen loading on the viologen-based polymer can be accessed electrochemically, as determined by bulk electrolysis. For viologen-based colloidal particles, more than 50% of the viologen moieties in the colloidal particles can be accessed electrochemically. Thus, the invention provides a non-aqueous redox flow battery with larger separator pores, larger redox active polymer and/or particle sizes, wherein the polymers and/or particles are more electrochemically active than currently known non-aqueous redox flow batteries.

The invention also provides a polymer of Formula I:

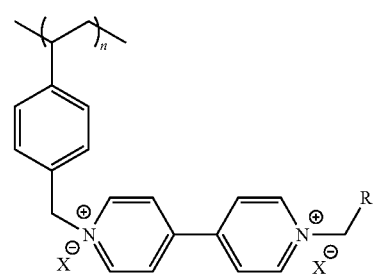

(I)

wherein
each X⁻ is a suitable anion;
R is H, alkyl, alkyl(aryl), or alkyl-alkoxy; and
n is sufficient to provide a polymer wherein n is such that the molecular weight ($M_n$) of the polymer is about 10 kDa to about 500 kDa.

The invention further provides a particle prepared by the emulsion or dispersion polymerization of 4-vinylbenzyl chloride and divinylbenzene, wherein the 4-vinylbenzyl chloride is present in excess of the divinylbenzene by about 20 to 100 fold, followed by contacting the resulting crosslinked polymer particle with an alkyl viologen, under conditions and for a period of time sufficient to allow the alkyl viologen to react with the particle, followed by isolation of the particle. The particles can be conveniently used as redox active particles in a non-aqueous flow battery.

The invention yet further provides a non-aqueous redox flow battery comprising: a positive electrolyte; a negative redox active species; and a size exclusion membrane separator, the size exclusion membrane being disposed between the positive electrolyte and the negative redox active species, wherein the redox active species is a polymer or colloidal particle as described herein.

The invention also provides novel polymers and colloidal particles described herein, intermediates for the synthesis of the polymers and colloidal particles, as well as methods of preparing the polymers and colloidal particles. The invention also provides polymers and colloidal particles that are useful as intermediates for the synthesis of other valuable compounds.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 12:
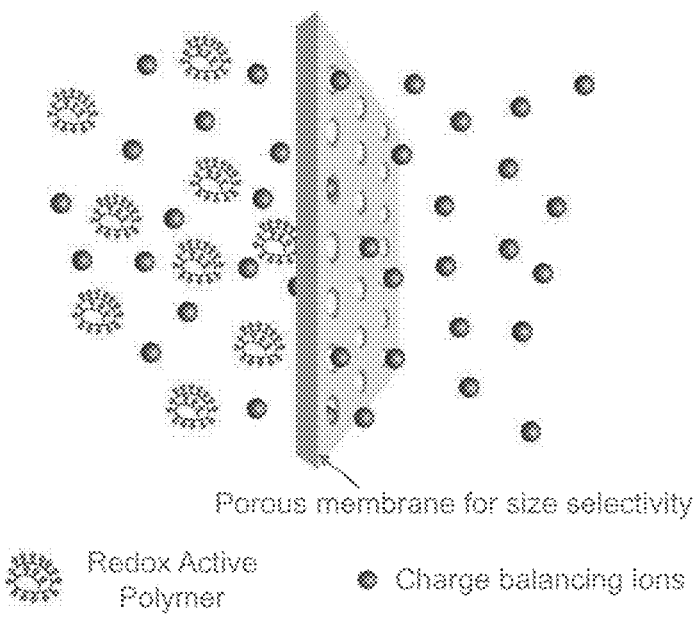
FIG. 12. A schematic of the separator and half cells on each side of the separator in a redox flow battery, according to an embodiment. Size exclusion based rejection of redox active macromolecules permits counter ions to pass through the separator.
Figure 13:
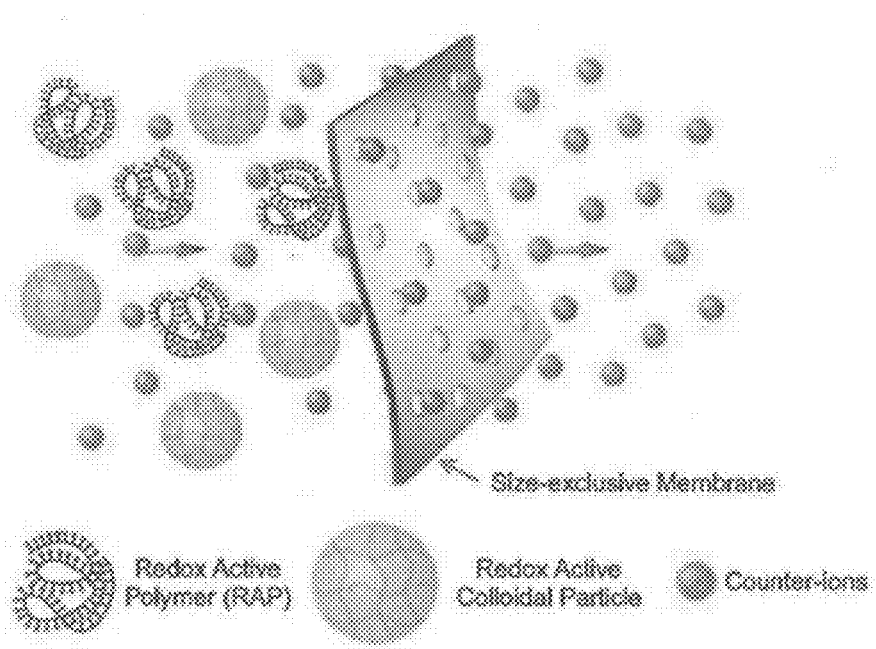
FIG. 13. A schematic of the separator and half cells on each side of the separator in a redox flow battery, according to an embodiment. Size exclusion based rejection of redox active macromolecules and colloidal particles permits counter ions to pass through the separator.

Conventional flow batteries rely on ion exchange membranes that selectively transport ions based on charge. In non-aqueous settings, ion exchange membranes experience high impedance and low current densities. Described herein is the use of size-exclusion membranes that selectively transport molecules based on size. Size-exclusion membranes allow the permeation of ions due to their small size, while rejecting the redox active material (anolyte and catholyte) due to their large size (see FIGS. 12 and 13). The size of the redox active material is changed by densely aggregating the redox active molecule, and/or designing macromolecule and colloidal particles of the redox active material.

Unlike IEMs, porous membranes transport molecules based on size. Thus by careful design of the redox active component for matching an appropriate size, one can take advantage of size-exclusion to selectively and efficiently transport charge-balancing ions across the porous membrane while retaining the active species in its compartment. Commercial off-the-shelf (COTS) porous separators are relatively inexpensive compared to IEMs, hence their utilization in NRFBs can reduce the overall cost of NRFBs. Although porous separators have been widely used in lithium-ion batteries, their use in NRFBs is not well explored. This could be due to the lack of development in redox active components whose size is easily varied without adversely affecting their electrochemical properties.

Controlling the molecular weight of redox active polymers (RAPs) is an easy way to vary the size of the redox active components. Understanding the size-dependent transport, solubility and electrochemical properties of RAPs enables their use in conjunction with COTS porous membranes as separators in NRFBs. To the best of our knowledge, there are no known RAPs with the desired solubility, energy density and (electro)chemical reversibility in NRFBs. Poly(vinyl ferrocene) and poly(vinyl anthracene) are well-studied RAPs for benchmarking the properties of soluble macromolecular designs. In this disclosure, we describe the synthesis of viologen-based RAPs of different molecular weight (MW), and study the impact of polymer MW on their electrochemical, solubility, viscosity and transport properties across commercial porous membranes as a means for enabling size-selectivity for NRFBs.

The non-aqueous redox flow battery described herein solves currently existing problems in non-aqueous flow batteries such as low concentrations of redox active species; membrane crossover of redox active species; and low ionic conductivity of non-aqueous flow batteries. This invention thus provides a way to increase the concentration of redox active species (anolyte and catholyte), energy density, power and columbic efficiency of flow batteries; improves the ionic conductivity in flow cell batteries; and also enables the use of less expensive size-exclusion membranes for non-aqueous flow batteries.

Redox active polymers and colloidal particles of various molecular weights were synthesized and analysis of their electrochemical properties confirmed that they serve as suitable redox active materials for flow battery applications. The polymers were found to be soluble in standard non-aqueous flow battery electrolyte solutions (e.g., 1 M $LiBF_4$ in propylenecarbonate or acetonitrile), typically at greater than 1M concentrations. Polymer crossover across size exclusion membranes was tested using a diffusion cell with a membrane of pore size 43 nm and porosity 41% (e.g., a Celgard® 2400 membrane). The polymers were rejected in significant amounts by the membrane, compared to small molecules.

Viologen-based redox active polymers and colloidal particles thus were synthesized and were demonstrated to be suitable redox active materials for flow batteries. The redox active polymers, compared to small molecule, are rejected more by size exclusion membranes, thereby reducing crossover and improving the performance of the non-aqueous flow battery.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture or to bring about an electrochemical reaction. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

As used herein, a "separator" is a porous size-exclusion material that serves to separate the anode and cathode space of the battery. The separator substantially retains redox active polymers and colloidal particles to the compartment of the battery that contains them. Additionally, the separator should be highly permeable to conducting salts of the electrolyte that serves for charge equalization (i.e., the anions and cations of the conducting salt). The separator thus distinguishes between the larger redox active components and the smaller ions of the electrolyte solution based on size and/or hydrodynamic radius.

A "viologen-based polymer" is a polymer such as a poly(vinylbenzyl) polymer linked to an alkyl viologen. Viologens are bipyridyl derivatives, in particular the 4,4'-bipyridyl derivatives that are alkyl-substituted in the 4,4'-position, e.g., with an ethyl group. The viologens can be also substituted with aryl, alkyl(aryl) (e.g., benzyl), alkoxy-substituted alkyl, and other suitable groups whose starting material includes a suitable leaving group to bond to a nitrogen of the viologen.

Non-Aqueous Redox Flow Batteries.

Non-aqueous redox flow batteries (NRFB) are electrochemical energy stores. The components required for establishing potential at the electrodes of the battery are dissolved or suspended redox-active species that can be converted into their other redox state in an electrochemical reactor during the charging or discharging process. For this purpose, the electrolyte solutions (catholyte, anolyte) can be actively pumped from a supply tank to the electrodes. The anode space and cathode space are separated in the reactor by a porous size-selective membrane. As long as electrolyte solution is pumped, power can be taken off the battery. The charging process is simply the reverse of this process. The quantity of energy that can be stored in a NRFB is therefore directly proportional to the size of the storage tank. The power that can be taken off is a function of the size of the electrochemical reactor.

The construction of redox flow batteries is well known and has been described in detail, for example, by Darling et al., "Pathways to low cost electrochemical energy storage: a comparison of aqueous and nonaqueous flow batteries", *Energy Environ. Sci.,* 2014, 7, 3459-3477, and in U.S. Patent Application Publication No. 2013/0224538 (Jansen et al.), which are incorporated herein by reference.

In one embodiment, the invention provides a non-aqueous redox flow battery comprising:

a negative electrode immersed in a non-aqueous liquid negative electrolyte, a positive electrode immersed in a non-aqueous liquid neutral or positive electrolyte, and a separator between the negative and positive electrolytes, which separator achieves separation by size exclusion (size exclusion separator);

the negative electrode positioned within a negative electrolyte chamber ("NE chamber") defined by a first housing and containing the negative electrolyte, e.g., a RAP or RAC as described herein, the NE chamber is connecting with a first negative electrolyte reservoir ("NE reservoir") and a second NE reservoir such that the first NE reservoir, the NE chamber, and the second NE reservoir can be placed in fluid-flow communication and collectively define a negative electrolyte circulation pathway;

a first pump being operably positioned within the negative electrolyte circulation pathway to circulate the negative electrolyte back and forth between the first NE reservoir and the second NE reservoir over the negative electrode;

the positive electrode being positioned within a positive electrolyte chamber ("PE chamber") defined by a second housing and containing the neutral or positive electrolyte, the PE chamber connecting with a first positive electrolyte reservoir ("PE reservoir") and a second PE reservoir such that the first PE reservoir, the PE chamber, and the second PE reservoir can be placed in fluid-flow communication and collectively define a positive electrolyte circulation pathway;

a second pump being positioned within the positive electrolyte circulation pathway to circulate the positive electrolyte back and forth between the first PE reservoir and the second PE reservoir over the positive electrode;

the negative and positive electrolytes each independently comprising an electrolyte salt and an electrochemically stable organic solvent; and the NE chamber and the PE chamber being separated from one another by the size exclusion separator, such that cations from the electrolyte salt can flow back and forth between the NE chamber and the PE chamber to balance charges resulting from oxidation and reduction of the redox reactants during charging and discharging of the battery;

wherein the redox reactants are one or more RAPs or RACs described herein.

The non-aqueous liquid electrolyte solution or suspension of the non-aqueous redox flow battery includes an organic solvent. The organic solvent can be a carbonate solvent, a nitrile, an ether, an aromatic compound, an ester, or a combination thereof. Specific examples of suitable carbonate solvents include, but are not limited to, propylenecarbonate, ethylenecarbonate, ethylmethylcarbonate, diethylcarbonate, and dimethylcarbonate. Examples of suitable nitriles include, but are not limited to, acetonitrile, 1,4-dicyanobutane, and 1,6-dicyanohexane. Examples of suitable ethers can include, but are not limited to, diethylether, 1,4-dioxane, diethyleneglycoldiethylether, ethylether, and tetrahydrofuran. Examples of suitable aromatic compounds include, but are not limited to, benzene, toluene, and 1,2-dichlorobenzene. An example of a suitable glycol includes, but is not limited to, triethyleneglycol. Examples of suitable esters include, but are not limited to, ethylacetate and t-butylacetate. Other solvents suitable for use in the non-aqueous redox flow battery described herein are described by Darling et al., Pathways to low cost electrochemical energy storage: a comparison of aqueous and nonaqueous flow batteries, *Energy Environ. Sci.*, 2014, 7, 3459-3477, incorporated by reference.

In some embodiments, the non-aqueous solvent is a polar solvent. Suitable polar organic solvents can include, but are not limited to, acetonitrile, acetone, tetrahydrofuran, acetic acid, acetyl acetone, 2-aminoethanol, aniline, anisole, benzene, nitrobenzene, benzonitrile, benzyl alcohol, 1-butanol, 2-butanol, iso-butanol, 2-butanone, t-butyl alcohol, carbon disulfide, carbon tetrachloride, chlorobenzene, chloroform, cyclohexane, cyclohexanol, cyclohexanone, di-n-butyl-phthalate, 1,1-dichloroethane, dichloroethane, diethylamine, diethyleneglycol, diglyme, dimethoxyethane (glyme), tetraglyme, N,N-dimethylaniline, dimethylformamide (DMF), dimethylphthalatem, dimethylsulfoxide (DMSO), dioxane, ethanol, ether, ethyl acetate, ethylacetoacetate, ethylbenzoate, ethyleneglycol, heptane, hexane, methanol, methylacetate, methylt-butylether (MTBE), methylenechloride, 1-octanol, pentane, 1-pentanol, 2-pentanol, 3-pentanol, 2-pentanone, 3-pentanone, 1-propanol, 2-propanol, pyridine, tetrahydrofuran (THF), toluene and p-xylene.

The non-aqueous redox flow batteries described herein include a microporous or nanoporous separator. Suitable separator materials include polyolefins such as polyethylene and polypropylene, ethylene-propylene copolymers, polyimides, polyvinyldifluorides, and the like, and other materials that do not react with the battery electrolytes and solvents. The separators can be in the form of membranes, including bi-layer and tri-layer membranes, sheets, films, or panels. Other suitable materials include porous ceramics, porous insulated metals, and zeolites. Other suitable porous films, panels or mesh will be readily understood by those skilled in the art.

The solvent for the RAPs should be a solvent in which the RAP has a high solubility. In some embodiments, the RAP has a solubility of about 0.5M or greater. In some embodiments, the RAP has a solubility of about 1.0M or greater. In other embodiments, the RAP has a solubility of about 2.0M or greater. In further embodiments, the RAP has a solubility of about 3.0M or greater. Some RAPs can have a solubility of about 4.0M or greater, about 5.0M or greater. In various embodiments, the RAP can have a solubility in the non-aqueous liquid electrolyte solution of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 M. The high solubility of the RAPs described herein in conjunction with the non-aqueous redox flow battery provides a higher capacity battery that can be used in commercial applications. Similarly, the solvent for the RACs should be a solvent in which the RAC can form a suitable and stable emulsion, microemulsion, or fine dispersion.

A variety of electrolytes can be used to provide the electrolyte solution of the non-aqueous redox flow battery. The non-aqueous electrolyte solution can be, for example, a metal halide salt or an ammonium halide salt. Non-limiting examples of the salt include $LiBF_4$, $NaBF_4$, $LiPF_6$, $NaPF_6$, lithium bis(oxalato)borate, tetra-n-butylammonium hexafluorophosphate, tetra-n-butylammonium bromide, tetra-n-butylammonium tetrafluoroborate, and the like. In some embodiments, the metal halide salt comprises a cation such as, for example, $Li^+$ and/or $Na^+$, $K^+$, $Mg^{+2}$, $Ca^{-2}$, $NH_4^+$, $N(alkyl)_4^+$, and the like. The metal halide salt can include anions such as, for example, $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, and $B_{12}X_6H_{(12-n)}^{2-}$, wherein X is a halogen. The discussion of electrolytes and electrolyte solutions described herein typically refer to $LiBF_4$, but any of the aforementioned salts can be used when suitable and effective.

In addition to the polyvinylbenzene polymer backbones described herein, other polymer backbones can be used for preparation of the redox active polymers and colloidal particles. Examples of compounds that can be used to prepare the polymer backbone of redox active species are polymers derived from ethylenically unsaturated carboxylic acids, or esters or amides thereof, e.g., polyacrylates, polymethacrylates, or polyacrylamide, as well as polymers derived from ethylenically unsaturated aryl compounds, e.g., polystyrene and substituted versions thereof, polymers derived from vinyl esters of saturated carboxylic acids or derivatives thereof, e.g., polyvinyl acetate or polyvinyl alcohol, polymers derived from olefins or bicyclic or polycyclic olefins, e.g. polyethylene, polypropylene or polynorbomene, polyimides derived from imide-forming tetracarboxylic acids and diamines, polymers derived from natural occurring polymers and their chemically modified derivatives, e.g., cellulose or cellulose ethers, and also polyurethanes, polyvinyl ethers, polythiophenes, polyacetylene, polyalkylene glycols, poly-7-oxanorbomene, polysiloxanes, polyalkylene glycol and derivatives thereof, e.g., ethers thereof, such as polyethylene glycol and derivatives thereof. Particularly useful classes of materials for the polymer backbone are polyacrylates, polymethacrylates, polystyrene, polyalkylene glycols and polyvinyl ethers, which can be substituted with leaving groups such as chlorides to link the polymers to redox active species such as ferrocenyl, nitrobenzene, isonicotinate, quinoxaline, phenylenediamine, or dimethoxy benzene moieties. Examples of such redox active polymers are shown below in Scheme A, however other polymer backbones as described above can be linked to the redox active species.

Scheme A. Examples of various redox active polymers.

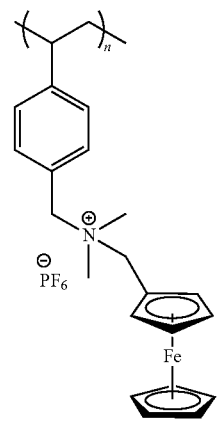

-continued

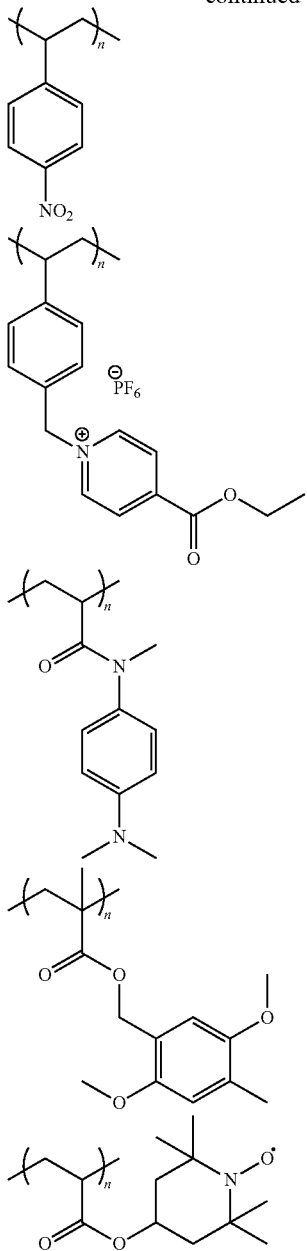

where n is such that the average molecular weight ($M_n$) of the polymer is about 15 kDa to about 500 kDa, or about 18 kDa to about 350 kDa. The counter ions of the polymers can be $PF_6^-$ or a variety of counter ions other than $PF_6^-$ (described above), depending on the preparation and isolation process.

The redox flow battery described herein can be used in a variety of fields and for various applications. Uses of the flow batteries include the storage of electric energy for mobile and stationary applications. Examples of applications include uses in the field of electromobility, e.g., as energy store in land, air and water vehicles, uses as stationary energy store for emergency power supply, peak load equalization, and for the temporary storage of electric energy from renewable energy sources such as from photovoltaics and wind power. The redox flow batteries can be connected to one another in series or in parallel in a manner known to one of skill in the art. In some instances, the non-aqueous redox flow battery provides stability over about 100 cycles, 500 cycles, 750 cycles, 900 cycles, or 1000 cycles.

Redox Active Polymers and Colloids

Enhancing the ionic conductivity across the electrolyte separator in non-aqueous redox flow batteries (NRFBs) is essential for improving their performance and enabling their widespread utilization. Separating redox active species by size-exclusion without greatly impeding the transport of supporting electrolyte is a potentially powerful alternative to the use of poorly-performing ion-exchange membranes. However, this strategy has not been explored possibly due to the lack of suitable redox active species that are easily varied in size, remain highly soluble, and exhibit good electrochemical properties.

Described herein is the synthesis, electrochemical characterization, and transport properties of redox active poly (vinylbenzyl ethylviologen) (RAPs) with molecular weight between about 15 and about 500 kDa. The RAPs reported here show very good solubility (up to about 3 M) in organic solvents such as acetonitrile and propylene carbonate. Ultramicroelectrode voltammetry reveals facile electron transfer with $E\frac{1}{2}\sim-0.7$ V vs. $Ag/Ag^+$ (0.1 M) for the viologen 2+/+ reduction at concentrations as high as 1.0 M in acetonitrile. Controlled potential bulk electrolysis indicates that 94-99% of the nominal charge on different RAPs is accessible and the electrolysis products are stable upon cycling.

The dependence of the diffusion coefficient on molecular weight indicates the adequacy of the Stokes-Einstein formalism to describe RAPs. The size-selective transport properties of $LiBF_4$ and RAPs across commercial off-the-shelf (COTS) separators such as Celgard® 2400 and Celgard® 2325 membranes were tested. COTS porous separators show ca. 70 times higher selectivity for charge balancing ions ($Li^++BF_4^-$) compared to high molecular weight RAPs. RAPs rejection across these separators showed a strong dependence on polymer molecular weight as well as the pore size; the rejection increased with both increasing polymer molecular weight and reduction in pore size. Significant rejection was observed even for $r_{poly}/r_{pore}$ (polymer solvodynamic size relative to pore size) values as low as 0.3. The high concentration attainable (>2.0 M) for RAPs in common non-aqueous battery solvents, their electrochemical and chemical reversibility, and their hindered transport across porous separators make them attractive materials for non-aqueous redox flow batteries based on membrane size-selectivity.

Poly(vinylbenzyl ethyl viologen) polymers (RAPs 1-5, Scheme 1A) of five different molecular weights ($M_n$=21, 104, 158, 233, and 318 kDa) were synthesized starting from poly(vinylbenzyl chloride) (PVBC). Typical synthesis of RAPs involved heating a mixture of PVBC and ethyl viologen in dimethyl formamide, followed by anion exchange with ammonium hexafluorophosphate. The resultant polymers were isolated and purified via precipitation. Quantitative functionalization of poly(vinyl benzylchloride) with ethyl viologen was confirmed by $^1$H NMR, ATR-IR, UV-Vis absorption spectra and elemental analyses (see Gavvalapalli et al., J. Am. Chem. Soc. 2014, 136, 16309-16316 and Supporting Information, incorporated herein by reference). PVBC of MW=5.3 kDa, 60 kDa, and 82 kDa were purchased from Polymer Source. The 27 kDa and 41 kDa PVBC polymers were synthesized using Reversible Addition-Fragmentation Chain-Transfer (RAFT) polymerization (Moraes et al., Beilstein J. Org. Chem. 2013, 9, 1226-1234).

The corresponding viologen monomer was also synthesized for comparison (Scheme 1A).

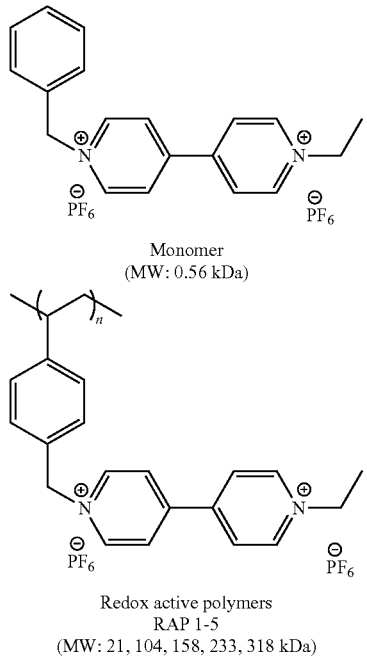

Scheme 1A. Chemical structures of monomer and redox active polymers (RAP 1-5).

Monomer
(MW: 0.56 kDa)

Redox active polymers
RAP 1-5
(MW: 21, 104, 158, 233, 318 kDa)

The viscosities of the RAPs 1-5 were measured using parallel plate rheometry at different concentrations from 0.01 to 1.0 M in acetonitrile. UV-Vis absorption spectra were recorded in acetonitrile at different concentrations to determine the molar absorption coefficient of the polymers. For all the studies, polymer concentration is defined as moles of repeat unit per liter. Polymer transport measurements across porous COTS separators were carried out at 0.01 M using PermeGear side-bi-side cell in which the separator was sandwiched between the donor cell (containing polymer solution) and receiver cell (containing a non-aqueous solvent, e.g., acetonitrile). Both solutions were stirred for 24 h to allow polymer to crossover into the receiver compartment to be analyzed. After 24 h, the concentration of RAP in the receiver cell was determined using UV-Vis absorption spectroscopy, and the percent polymer rejection was calculated (see Example 2 for details). The diffusion of $LiBF_4$ under similar conditions was determined from its conductance.

Electrochemical Methods.

Electrochemical experiments were performed on a CHI920D potentiostat and inside of an Ar-filled drybox with stringent control of $O_2$ and moisture levels. Chemical reagents, except for synthesized RAPs, were purchased from Sigma-Aldrich from the highest available purity and used as received. Unless specified, all voltammetric and bulk electrolysis experiments were carried out using a standard three electrode configuration with either a large-area Pt mesh (bulk electrolysis), 12.5 μm radius Pt ultra-micro electrode (UME), or 1.15 mm radius Pt disk electrode (transient voltammetry) as the working electrode, a non-aqueous $Ag/Ag^+$ reference electrode (CHI112, 0.1 M $AgNO_3$ in acetonitrile solution) and a graphite rod as counter electrode. Most experiments were carried out in a 3-chamber electrochemical cell with 1.6 μm glass frits. The transient voltammetry of viologen polymers was tested with a 10 mM effective concentration of repeating units for all RAPs 1-5 in 0.1 M $LiBF_4$ in acetonitrile as supporting electrolyte and using a 1.15 mm Pt disk as working electrode. Multiple scan cycles were performed until an adsorbed film of the RAP was deposited and stable. After rinsing several times with acetonitrile, Pt disk electrodes were immersed into blank 0.1 M $LiBF_4$ in acetonitrile electrolyte to test RAP adsorption at different scan rates.

The chemical stability and charge storage properties of RAPs were studied by bulk electrolysis (BE), by holding a Pt mesh working electrode at a constant potential while stirring at constant rate and recording the current and charge passed through the system. We used an initial concentration of 10 mM RAPs 1-5 in 0.1 M acetonitrile solution. All solutions started from the 2+ viologen form. The Pt mesh was held at −0.9 V for BE reduction (2+/+) and at −0.3 V for BE oxidation (+/2+). See Scheme 1B. The second viologen reduced state (+/0) was accessed by holding the Pt mesh at −1.4 V. Steady state UME voltammograms were obtained before and right after bulk electrolysis with 12.5 μm Pt tip as working electrode. The time dependent evolution of + viologen electrolytes was followed by tracking the steady state voltammograms approximately every 10 min after BE until an unchanging limiting current was recorded.

Scheme 1B. Reduction reaction of redox active polymers (RAP 1-5).

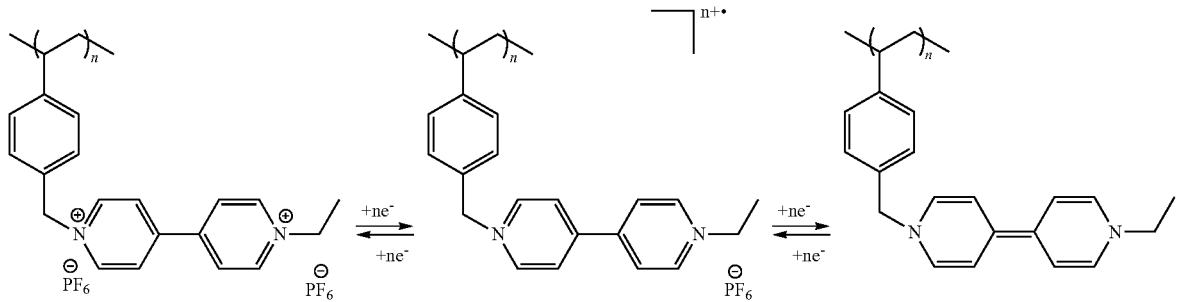

The UME limiting current of monomer and polymers at high concentration were studied for the 2+/+ reductive process. A small portion (~100 μL) of 1.0 M monomer of RAPs solution in acetonitrile was used as the starting material and then different volumes of 0.5 M LiBF$_4$ in acetonitrile solution were added for diluting to different concentrations. These measurements were achieved on the small volumes through a two-electrode configuration using a Pt wire wrapped around the UME as counter electrode.

Characterization of RAPs 1-5.

The percent functionalization of PVBC with ethyl viologen was determined using $^1$H NMR, ATR-IR, UV-Vis absorption spectra and elemental analyses. In PVBC, $v_{CH2Cl}$ stretch appears at 1280 cm$^{-1}$. ATR-IR spectra of RAPs 1-5 show a complete disappearance of the peak at 1280 cm$^{-1}$ and also display the peak corresponding to the viologen quaternary amine ($v_{>N+<}$) at 1650 cm$^{-1}$. UV-visible absorption spectra of monomer and polymers were recorded in acetonitrile at different concentrations and their molar absorption coefficients were determined (Table 1). For a given concentration of repeat units, the molar extinction coefficients of RAPs were found to be close to that of monomer, indicating the near-quantitative substitution of PVBC with ethyl viologen.

TABLE 1

Molar extinction coefficients of monomer and RAPs in acetonitrile.

| Molecular weight (kDa) | Molar extinction coefficient (ε M$^{-1}$ cm$^{-1}$) |
| --- | --- |
| 0.56 | 23730 |
| 21 | 23918 |
| 104 | 22646 |
| 158 | 23983 |
| 233 | 23425 |
| 318 | 24360 |

$^1$H NMR, elemental analyses, and bulk electrolysis (see below) data further support the near-quantitative functionalization of PVBC with ethyl viologen.

RAPs 1-5 display good solubility in non-aqueous electrolytes such as acetonitrile and propylenecarbonate, both commonly used solvents in NRFBs. The 21 kDa polymer is soluble up to 2.9 M in acetonitrile, while the MW 318 kDa polymer is soluble up to 2.1 M (Table 2).

TABLE 2

Solubility limits of RAPs in acetonitrile.

| Polymer MW (kDa) | Solubility Limit (M) |
| --- | --- |
| 21 | 2.9 |
| 104 | 2.9 |
| 158 | 2.4 |
| 233 | 2.6 |
| 318 | 2.1 |

The monomer showed negligible change in viscosity with an increase in concentration from 0.01 to 1.00 M, whereas the viscosity of polymer solutions increased with increasing molecular weight and concentration (Table 3).

TABLE 3

Viscosity of polymers at different concentrations.

| Polymer (kDa) | Viscosity (mPa * s) | | | | |
| --- | --- | --- | --- | --- | --- |
| | 0.01M | 0.1M | 0.25M | 0.75M | 1.0M |
| 0.56 (Monomer) | 9.31 ± 0.05 | 9.3 ± 0.1 | 9.12 ± 0.03 | 11 ± 2 | 11.8 ± 0.1 |
| 21 | 8.9 ± 0.1 | 9.25 ± 0.08 | 10.2 ± 0.1 | 55 ± 8 | 128 ± 9 |
| 104 | 9.55 ± 0.04 | 10.10 ± 0.02 | 12.26 ± 0.03 | 50 ± 5 | 120 ± 20 |
| 158 | 9.18 ± 0.04 | 10.3 ± 0.3 | 12.39 ± 0.04 | 50 ± 4 | 103 ± 8 |
| 233 | 11 ± 1 | 11 ± 2 | 16.3 ± 0.1 | 100 ± 5 | 290 ± 20 |
| 318 | 9.1 ± 0.1 | 10.35 ± 0.02 | 13.7 ± 0.4 | 75 ± 4 | 220 ± 30 |

The similarity between the absorption spectra of the polymers and monomer indicates that there is minimal intrachain and interchain interaction between viologens in polymer solution. This interpretation is also supported by the electrochemical data discussed below.

Electrochemical Characterization of RAPs 1-5.

We chose a viologen-based macromolecular design because the monomeric units have a small molecular footprint, are highly soluble in polar solvents, show appealing reduction potentials, and undergo facile electron transfer with chemical reversibility. This combination of properties makes them well-suited as low potential redox species in NRFBs as they promise high energy density, high stability during cycling and minimal electrode kinetics losses.

Figure 1:
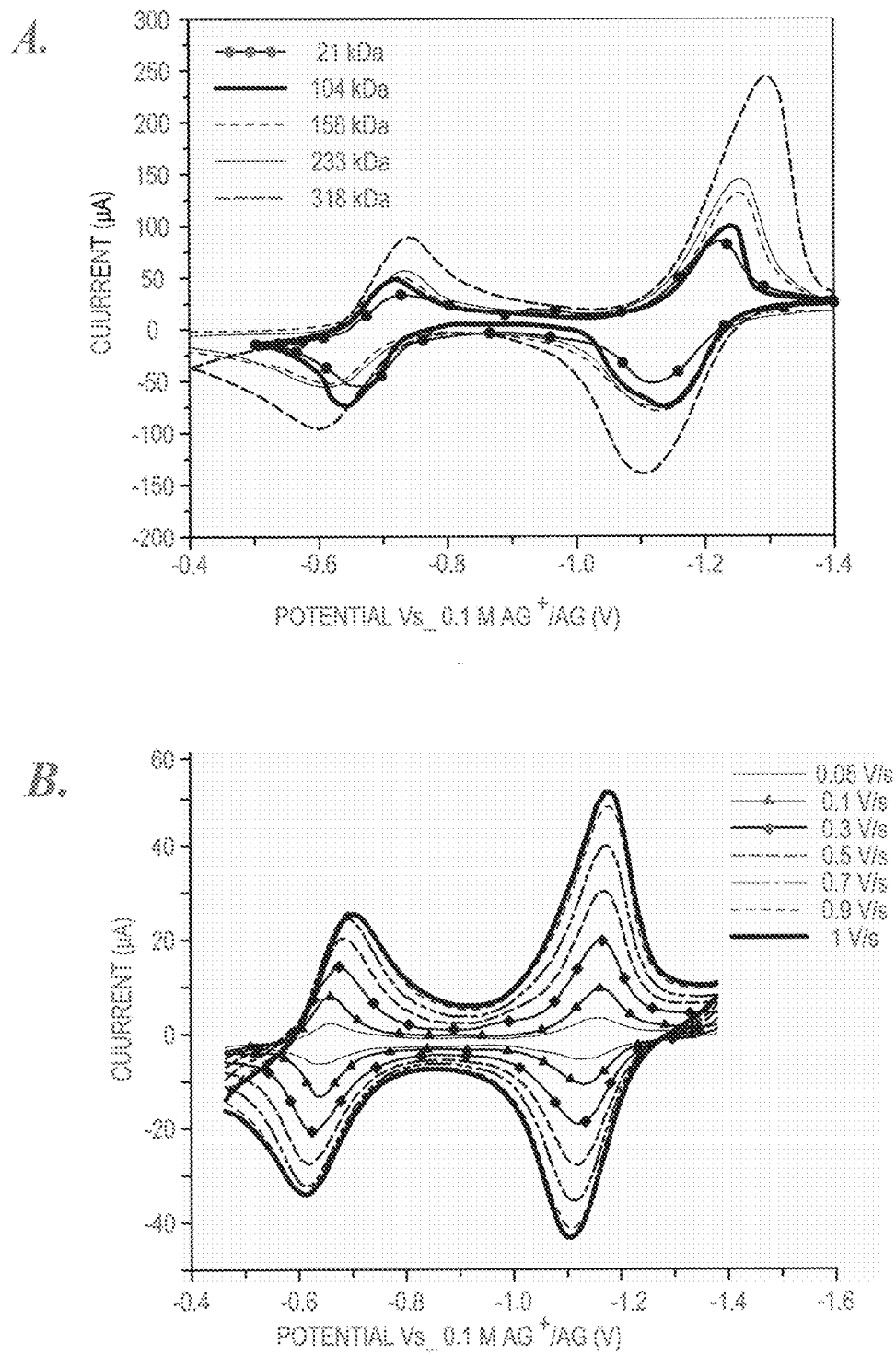
FIG. 1. Electrochemical characterization of RAPs 1-5. (a) Cyclic voltammograms of RAPs 1-5 on 0.04 cm$^2$ Pt disk electrode (v=100 mV/s). (b) Voltammetry of adsorbed RAP 1 on 0.04 cm$^2$ Pt disk electrode in blank supporting electrolyte. (c) Steady state voltammograms of RAPs 1-5 at 12.5 μm Pt UME (v=10 mV/s) for the original and reduced form. (d) Plot of monomer-normalized diffusion coefficient vs molecular weight for RAPs 1-5. Lower graph shows zoom of polymer high molecular weight region. In all experiments, RAP concentration was 0.01 M and 0.1 M LiBF$_4$ in acetonitrile was used as supporting electrolyte solution.

Transient voltammetry of 10 mM solutions of RAPs 1-5, shown in FIG. 1a, was recorded in acetonitrile with 0.1 M LiBF$_4$ as a supporting electrolyte using a 1.15 mm radius Pt electrode. The shape of these voltammograms indicates a mixed adsorptive and diffusive behavior for all tested polymers. In general, two clearly defined reductive processes are observed at c.a. −0.7 V and −1.2 V vs. 0.1 M Ag$^+$/Ag. For comparison, the monomer exhibits two Nernstian waves at similar potentials and with similar separation between the first (2+/+) and second (+/0) reductions. In addition to this similarity, the current intensities for different polymers at the same effective concentration of redox pendants are comparable and do not show a strong dependence on MW. These results indicate that viologen motifs do not interact electronically through the polymer backbone, in agreement with results from UV-Vis spectroscopy, and that the redox characteristics of RAPs 1-5 are essentially the same as that displayed by the monomer.

In contrast to the monomer, adsorption is likely to be observed in RAPs 1-5 because of a larger cross-section for interaction between the negatively charged electrode and the positively charged polymer as well as other physisorption interactions. Pt electrodes exposed to solutions containing RAPs 1-5 were carefully rinsed and transferred to blank electrolyte to confirm irreversible adsorption. The resulting voltammograms displayed the behavior associated with an adsorbed electroactive layer, as shown in FIG. 1b for RAP 1, where both reduction voltammetric peak currents increase proportionally to the scan rate. The surface density of redox active groups was estimated to be ca. 100-200 $\mu C/cm^2$ for RAP 1, which is at least one order of magnitude larger than a conservative estimate of a monolayer based on the molecular footprint and loading of the polymer (10 $\mu C/cm^2$).

Electrode surface roughness and limited electrostatic interactions with the electrode are possible causes of multilayer formation. Electrochemical data show evidence of charge transport in this polymer layer. A smaller peak splitting and larger intensity observed for the +/0 process in comparison to the 2+/+ is consistent with a larger rate of self-exchange for the viologen +/0 redox couple as has been observed in other polymer films, including those based on viologen. Despite irreversible adsorption, the film formed by RAPs 1-5 is electroactive and allows solution-based polymer molecules to engage in facile electron transfer and complete bulk reduction as demonstrated by microelectrode and chronocoulometric experiments described below.

Steady state voltammetry using ultra-microelectrodes (UMEs) were used to selectively study the diffusion behavior of RAPs 1-5. At small electrodes, the increase in the mass transfer coefficient of solution species masks the contribution from transient surface processes when voltammetry is conducted at low scan rates. FIG. 1c shows the UME voltammetry at 10 mV/s for both the reduction of the fully-oxidized (2+) and for the oxidation of the singly-reduced (+) forms of RAPs 1-5. These voltammograms show a characteristic sigmoid shape and few indications of kinetic complications as evidenced by their width and correspondence between the position of the cathodic and anodic curves. Despite the possibility of radical-initiated reactions during the transformation of viologen 2+ to the monovalent radical anion +, the position and intensity of the oxidation and reduction waves indicate no profound chemical changes in the sample as the midway potentials, $E_{1/2}$, remains unchanged. Although the limiting current for the oxidation of the + form is consistently slightly higher than that for the reduction of 2+, the similarity between their values indicate a facile and quantitative transformation of either form at the electrode surface.

The mass transfer limiting current is estimated as $i_{lim}=4nFaDc^*$ where n=1, F=96,485 C/mol, $\alpha$=12.5 $\mu$m, D is the apparent diffusion coefficient of viologen motifs and c* is their concentration in the bulk. The diffusion coefficient of viologen groups in RAPs 1-5 are deduced from $i_{lim}$ for both original and reduced states. The diffusion coefficient values at concentrations below 10 mM are shown in Table 41.

TABLE 4

Summary of electrochemical characterization and transport properties of RAPs 1-5.

| M.W. (kDa) | Radius of RAPs (nm) | Diffusion coefficient of Original state ($10^{-10}$ m$^2$/s) | Diffusion coefficient of Reduced state ($10^{-10}$ m$^2$/s) | Rejection across celgard 2400 membrane | Rejection across celgard 2325 membrane | Permeability ($10^{-12}$ m$^2$/s) | Percent electroactive units (%) |
|---|---|---|---|---|---|---|---|
| 0.56 | 0.35 | 13.9 | 16.8 | 4.8 ± 0.5 | 3.1 ± 2.6 | 14.82 ± 1.00 | 100 |
| 21 | 4.1 | 1.22 | 1.36 | 45.9 ± 0.4 | 84.6 ± 0.9 | 3.95 ± 0.50 | 96 |
| 104 | 5.1 | 0.95 | 1.07 | 72.0 ± 2.9 | 81.1 ± 1.9 | 3.53 ± 0.03 | 98 |
| 158 | 7.2 | 0.67 | 0.87 | 80.9 ± 0.7 | 86.3 ± 2.7 | 1.76 ± 0.20 | 94 |
| 233 | 6.5 | 0.73 | 0.74 | 81.0 ± 2.1 | 88.5 ± 0.3 | 2.10 ± 0.50 | 96 |
| 318 | 7.1 | 0.66 | 0.73 | 86.3 ± 0.5 | 92.8 ± 0.7 | 2.06 ± 0.30 | 96 |

Figure 7:
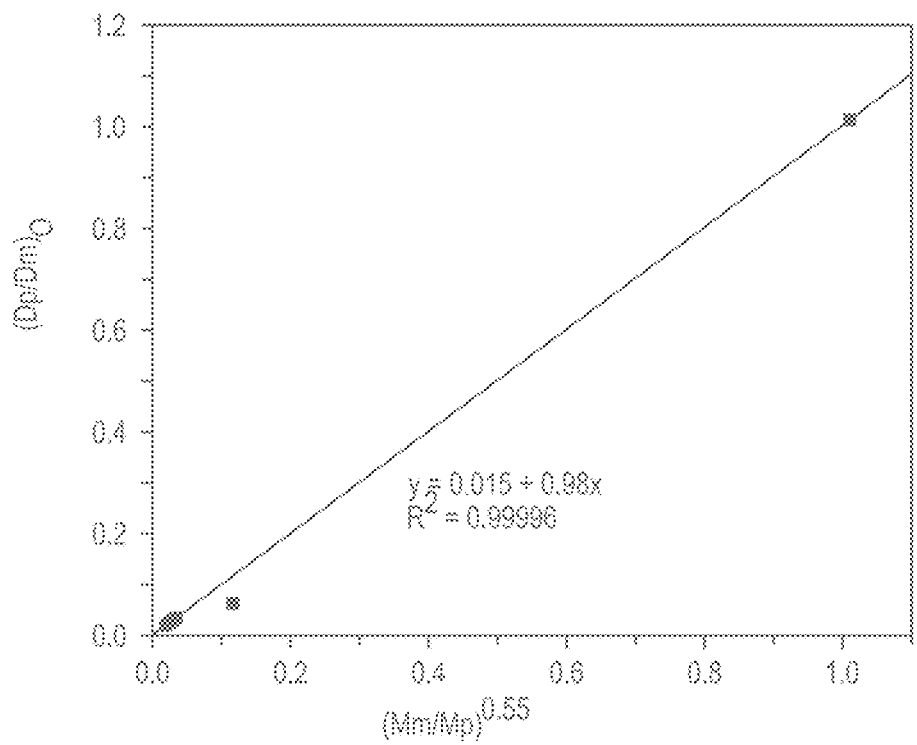
FIG. 7. Diffusion Coefficient—Molecular weight Relationship. Original viologen polymer diffusion coefficient vs. molecular weight relationship. This figure show a good linear relationship between ratio of the diffusion coefficient of polymer to monomer: (Dp/Dm) to 0.55 power of the ratio of molecular weight of monomer and polymer (Mm/Mp)$^{0.55}$. Fitting result is shown in above equation. Polymer region is shown in the lower graph.
Figure 7:
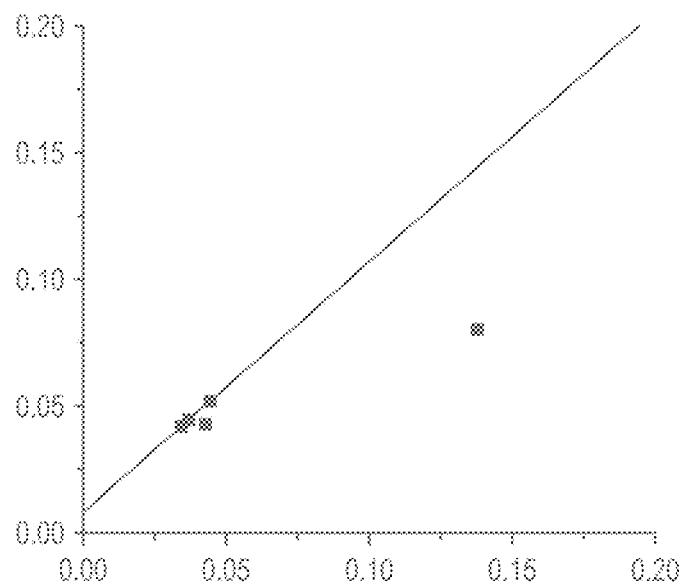

In general, smaller diffusion coefficients were observed as the molecular weight of the polymer increased. The ratio of the diffusion coefficient of polymer to monomer, $D_p/D_m$, varies linearly with respect to the 0.55 power of the ratio of molecular weight of monomer and polymer, $(M_m/M_p)^{0.55}$, as plotted in FIG. 1d for the + and FIG. 7 for the 2+ form. This behavior has been empirically observed for non-interacting redox centers in ferrocene redox polymers and explains the decrease in limiting current as a consequence of the impact of molecular weight on the diffusion coefficient following the behavior predicted by the Stokes-Einstein equation. This result allows us to confidently estimate the diffusion coefficients shown in Table 4 and strongly suggests the non-interacting and quantitative transformation of viologen groups in RAPs 1-5 regardless of their size.

Charge Storage in RAPs.

Figure 2:
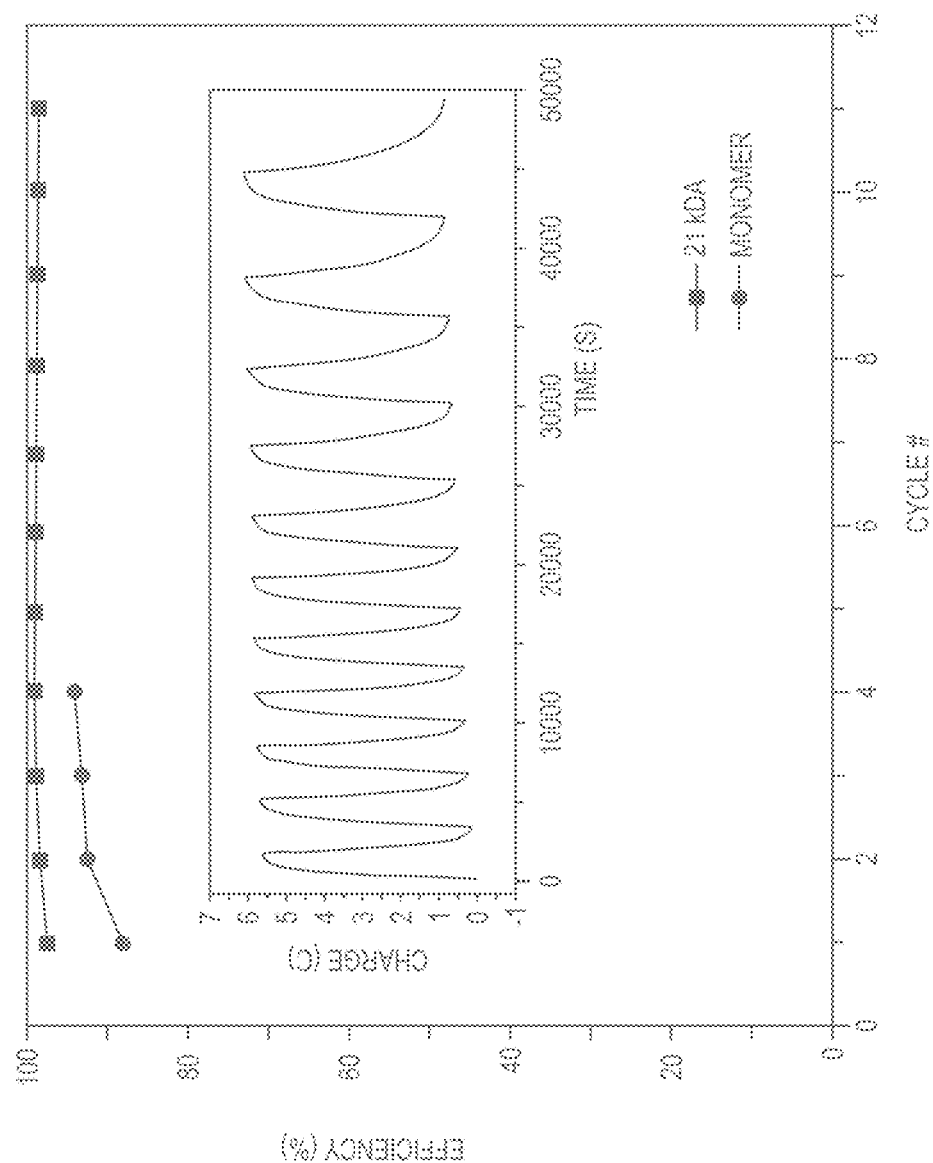
FIG. 2. Charge storage properties of monomer and RAP 1 (21 kDa). Inset shows 11 cycles of potential controlled bulk electrolysis of 6 mL 10 mM RAP 1 in 0.1 M LiBF4 acetonitrile using a Pt mesh working electrode. Pt mesh was held at −0.9 V for BE reduction (2+/+) and at −0.3 V for BE oxidation (+/2+). The charge cycling efficiencies were calculated as the ratio of BE oxidation to BE reduction for each cycle.

RAPs 1-5 display excellent charge storage properties, which make them suitable for NRFBs. FIG. 2 (Efficiency/Cycle and corresponding Charge-Time chart) shows results for the potential-controlled bulk electrolysis over multiple cycles for the 21 kDa polymer for the 2+/+ redox transformation. While there is a small decrease in the initial charge capacity (Table 5), no further signal decrease attributable to decomposition is observed upon consecutive cycles.

TABLE 5

Bulk Electrolysis Cycling Properties of 21 kDa RAP.

| Cycle Number | Total Charge Transferred at BE Reduction (C) | Percent of Charge Transferred at BE Reduction (%) | Total Charge Transferred at BE Oxidation (C) | Percent of Charge Transferred at BE Oxidation (%) | Cycling Efficiency (%) |
|---|---|---|---|---|---|
| 1 | 5.60 | 97 | 5.46 | 94 | 97 |
| 2 | 5.55 | 96 | 5.44 | 94 | 98 |

TABLE 5-continued

Bulk Electrolysis Cycling Properties of 21 kDa RAP.

| Cycle Number | Total Charge Transferred at BE Reduction (C) | Percent of Charge Transferred at BE Reduction (%) | Total Charge Transferred at BE Oxidation (C) | Percent of Charge Transferred at BE Oxidation (%) | Cycling Efficiency (%) |
|---|---|---|---|---|---|
| 3 | 5.50 | 95 | 5.41 | 94 | 99 |
| 4 | 5.45 | 94 | 5.38 | 93 | 99 |
| 5 | 5.42 | 94 | 5.35 | 92 | 99 |
| 6 | 5.38 | 93 | 5.32 | 92 | 99 |
| 7 | 5.35 | 92 | 5.29 | 91 | 99 |
| 8 | 5.32 | 92 | 5.25 | 91 | 99 |
| 9 | 5.28 | 91 | 5.20 | 90 | 98 |
| 10 | 5.25 | 91 | 5.16 | 89 | 98 |
| 11 | 5.21 | 90 | 5.11 | 88 | 98 |

The detailed cycling data of FIG. 2 is listed in this table, including the total amount of charge transferred at each bulk electrolysis half cycle (reduction/oxidation), percent of charge transferred compare with calculated theoretical charge (5.79 C), and cycling efficiency at each individual cycle.

Preliminary UME experiments conducted on the reduced form of RAPs 1-5 obtained by bulk electrolysis did show some decrease in their steady state current over a 2-4 hour period, however NMR and UV-Vis spectrophotometry did not reveal significant evidence of sample decomposition. A slow aggregation process of the reduced polymer molecules may be responsible for this observation; however, this does not affect their charge storage capacity. Indeed, RAP 1 displays a stable >97% cycling efficiency throughout 11 cycles, which is higher than monomer efficiency (FIG. 2) under the same experimental conditions. Bulk electrolysis experiments also showed that at least 94% of the nominal viologen loading on RAPs 1-5 is accessed electrochemically, thus confirming the quantitative UME voltammetry results and strongly suggesting that solution-based RAPs are versatile charge storage media for NRFBs. Table 4 above summarizes the result of our systematic electrochemical analysis of RAP 1-5.

Figure 3:
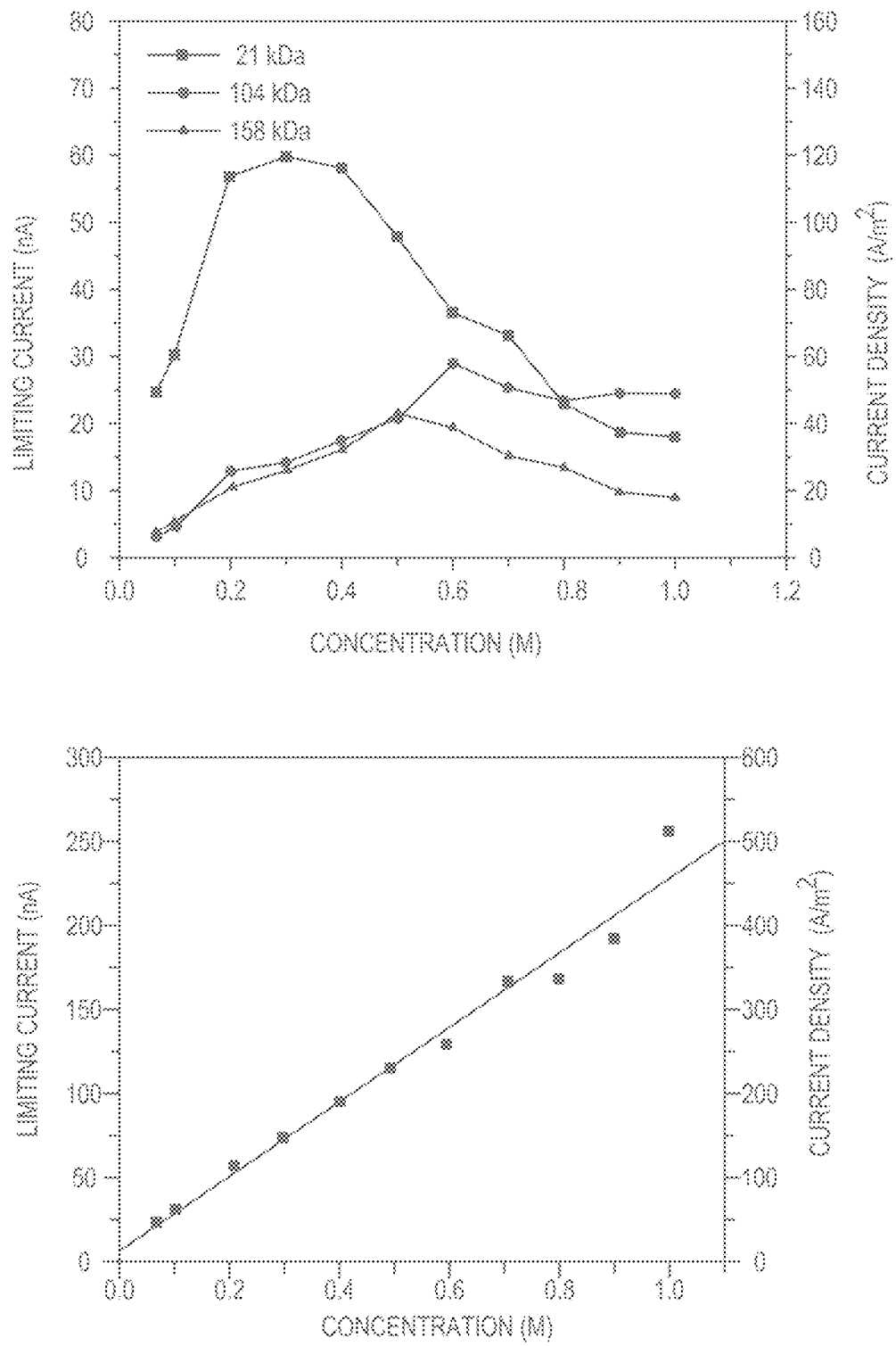
FIG. 3. Diffusion limited steady-state current change of selected RAPs at high concentration obtained using a 12.5 μm Pt UME in 0.5 M LiBF4 as supporting electrolyte. The current vs. concentration chart shows the expected limiting current for RAP 1 if corrected for viscosity effects.

For applications in NRFBs, achieving a high concentration of charge storage material is important for attaining a practical charge capacity. All five polymers are highly soluble in organic solvents such as acetonitrile and propylenecarbonate. We tested samples with concentrations up to ~1 M. Using UME voltammetry to minimize solution resistive potential drop, the electrochemical activity of RAP 1-5 was studied in the high concentration regime as shown in FIG. 3.

Figure 8:
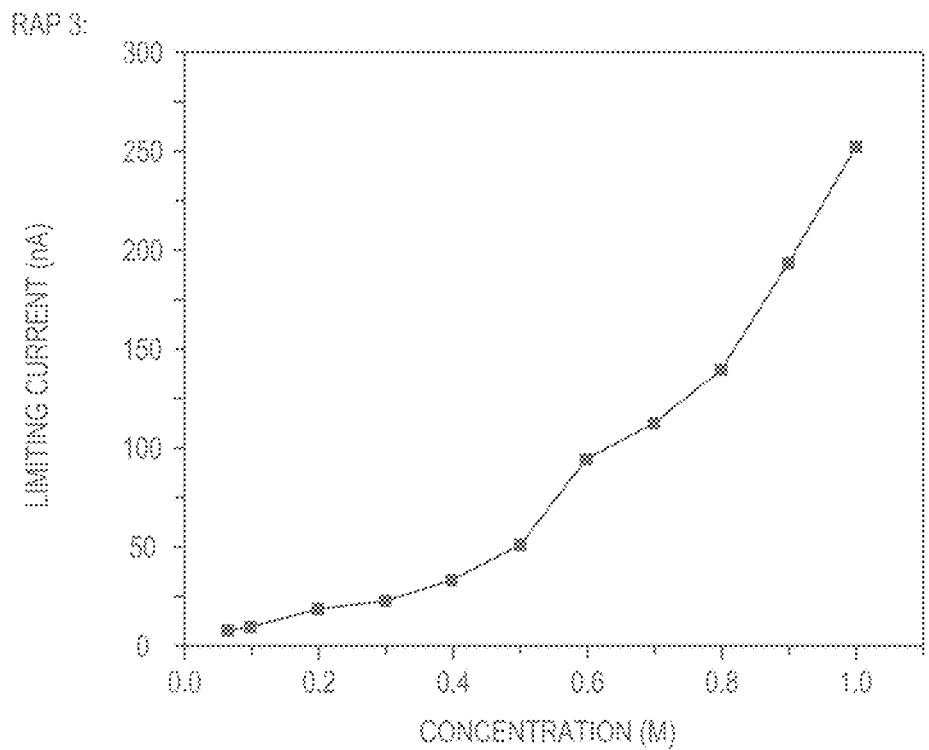
FIG. 8. Expected limiting current for RAPs 3 (left) and 5 (right) if data in FIG. 3 in the main text were corrected for solution viscosity (Table 3).
Figure 8:
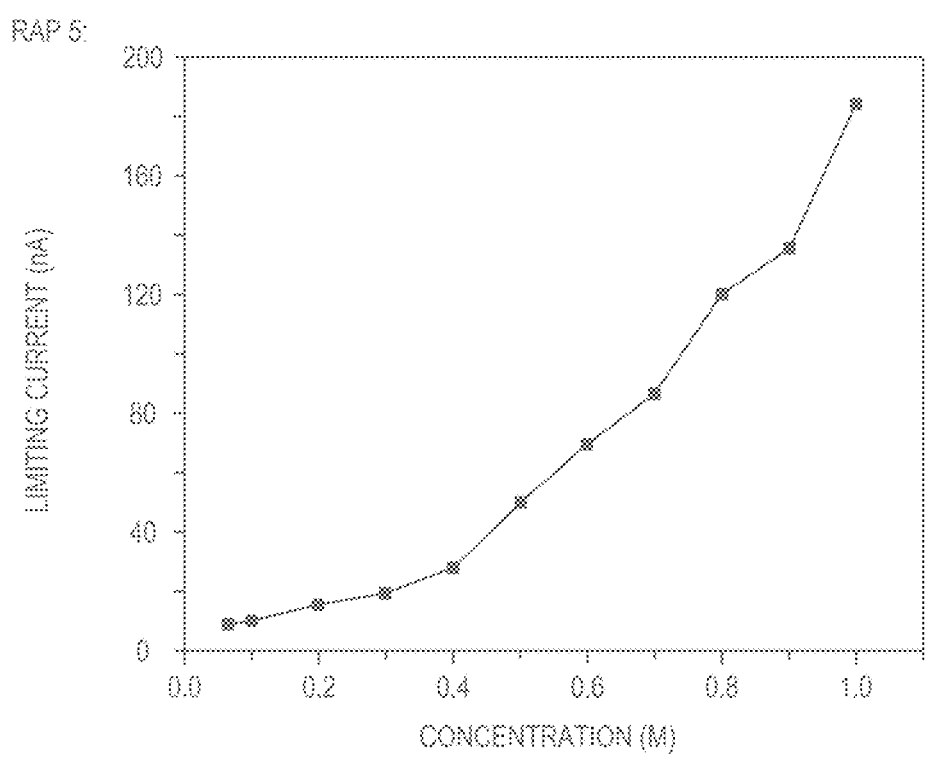

The diffusion limited steady state current increased with the polymer concentration until reaching a certain maximum (0.3 M for 21 kDa, 0.6 M for 158 kDa, and 0.5 M for 318 kDa) and decreased at higher concentration. This behavior has been observed in highly concentrated solutions of organic species. We tested the hypothesis that this decrease was due to an increase in solution viscosity, which in turn affected the diffusion coefficient. The Current vs. Concentration chart of FIG. 3 shows the prediction of the limiting current for RAP 1 at the UME if the experimental limiting currents are corrected for the increase in viscosity using an analogue of Walden's rule (similar plots can be obtained for other RAPs; FIG. 8). The observed linearity in this plot indicates that even at the most concentrated solutions, similar electrode processes to those observed in dilute 10 mM solutions apply, despite the possibility of multiple intermolecular and ion migration effects at high concentrations. Likewise, it is noteworthy that the concentrated solutions remain highly electroactive and able to support a steady state current, both properties are highly desirable for NRFBs and that indicate a lack of observed solution decomposition and electrode fouling. On the other hand, the decrease in current might suggest that increasing the charge capacity and energy density of a solution by concentrating RAPs implies a trade-off in the power density if used in NRFBs.

Figure 9:
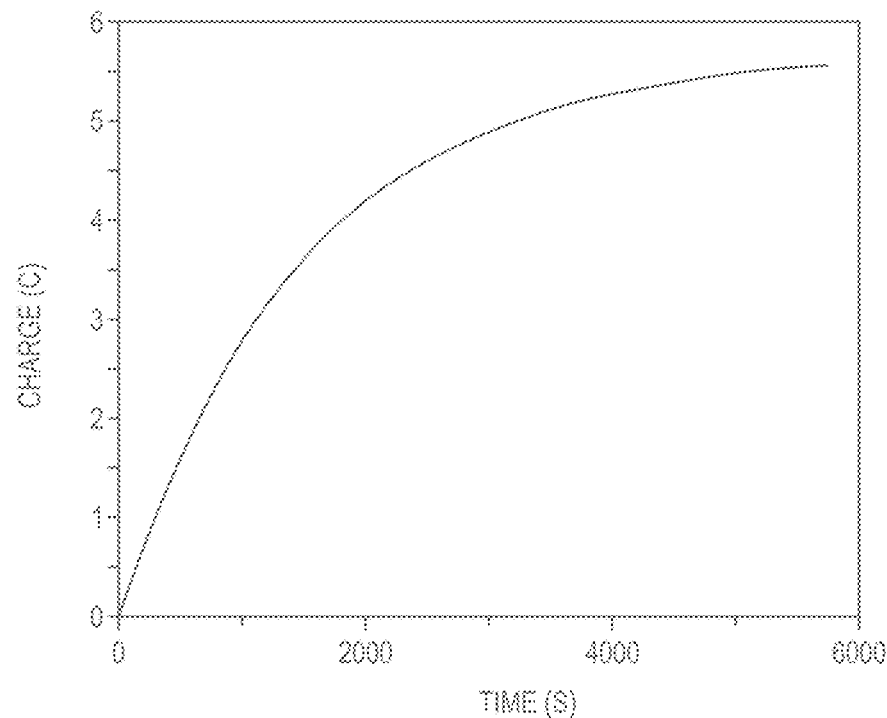
FIG. 9. Bulk electrolysis result of RAP 1 (21 kDa). (a) Charge—time relationship of BE first reduction state, which obtained 96% of nominal charge. (b) Log(current)—time relationship of BE first reduction state. (c) Charge—time relationship of BE directly to second reduction state. (d) Log(current)—time relationship of BE directly to second reduction state, which obtained 61% of nominal charge. Graphs (a) and (b): 6 mL 10 mM RAP 1 in 0.1 M LiBF$_4$ acetonitrile supporting electrolyte. Graphs (c) and (d): 15.51 mg RAP 1 in 3 mL 0.1 M LiBF$_4$ acetonitrile supporting electrolyte.
Figure 9:
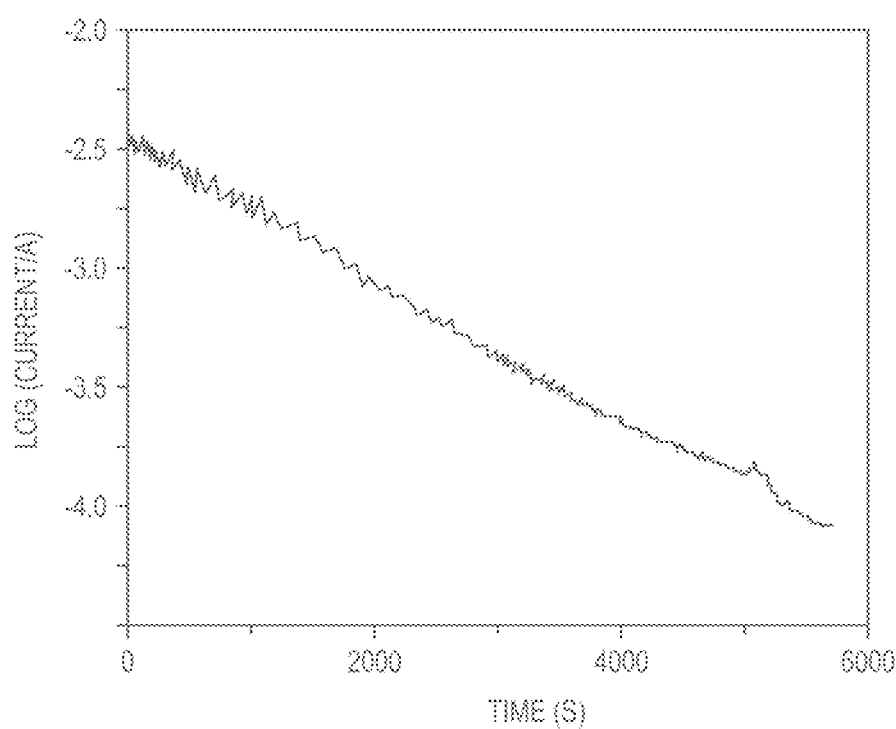

Another strategy to increase the charge capacity of RAPs 1-5 is to access the second reductive process. Preliminary experiments on RAP 1 showed that bulk electrolysis from the 2+ directly to the 0 state results in a recovery of only about 61% of theoretical charge (FIG. 9). Our laboratories are currently investigating ways to further improve this charge utilization. While FIG. 3 evidences complex interactions between the rheological and electrochemical properties of RAPs in solution, in practical terms, an attainable volumetric energy density of up to 14 Ah/L as well as their electrochemical and chemical reversibility makes them suitable candidates for NRFBs.

Size-Based Selectivity of COTS Porous Separators.

Figure 4:
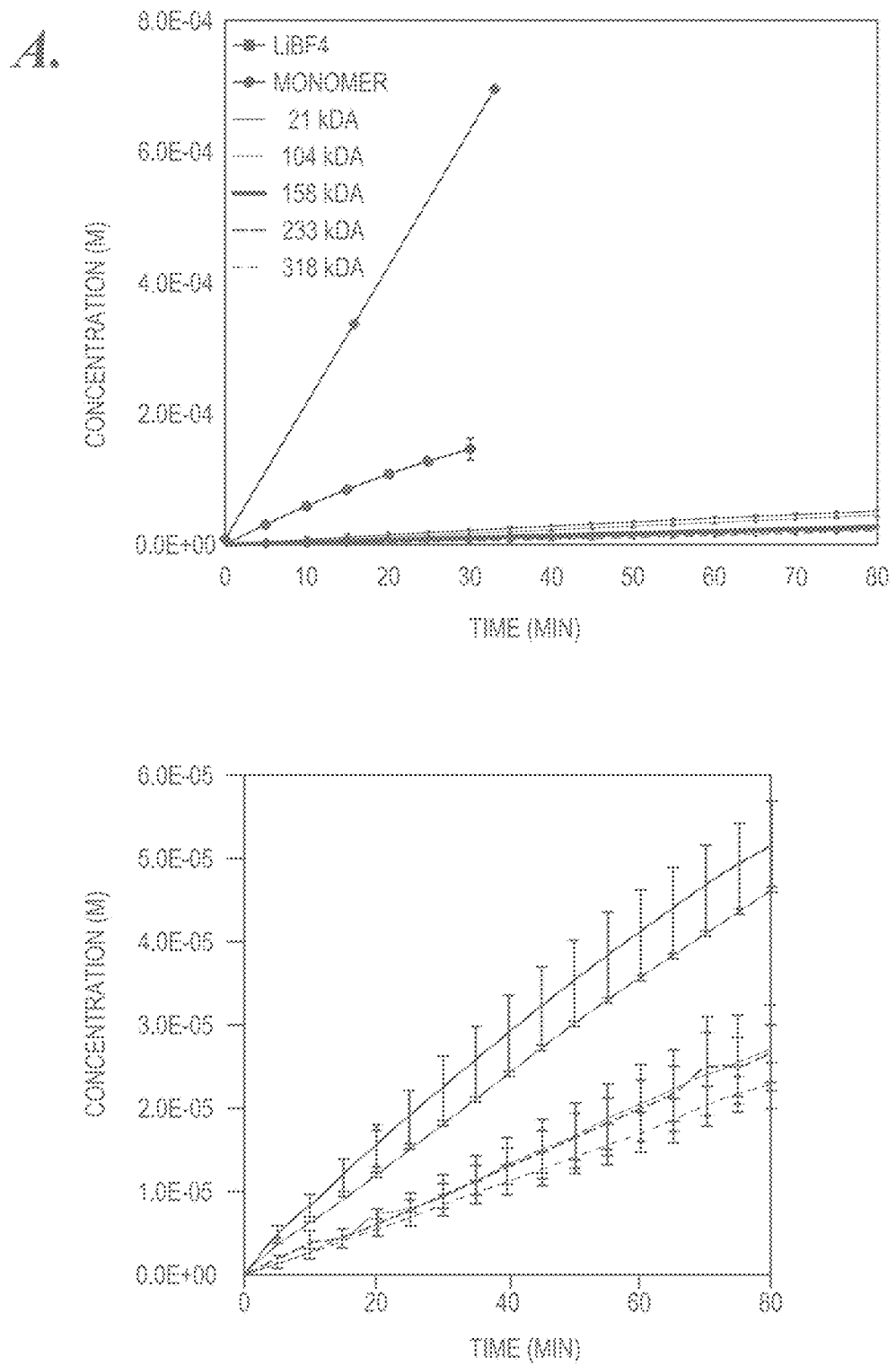
FIG. 4. (a) Time-dependent transport of LiBF4, monomer, and RAPs 1-5 across Celgard 2325 at 0.01 M. Lower graph shows the RAPs 1-5 region of the plot. (b) Size-based selectivity of Celgard 2325 for Li$^+$BF$_4^-$ compared to monomer and RAPs 1-5.

In the case of IEMs, the selectivity for ions is mainly due to their charge, whereas in porous separators the selectivity is based on size. To study the size-based selectivity of COTS porous separators for charge balancing ions compared to RAPs, permeability of LiBF4, monomer, and RAPs across porous separators was determined from time dependent transport studies (FIG. 4a). Time dependent transport across a Celgard® 2325 membrane (pore radius=14 nm) at 0.01 M was carried out using PermeGear side-bi-side cell. The solution in the receiver cell was flowed through a cuvette and the absorbance at absorption maximum was recorded at regular intervals to determine the crossed over monomer and polymer concentrations (see Shin et al. RSC Adv. 2013, 3, 9095-9116 and Mai et al. J. Power Sources 2011, 196, 482-487 for useful techniques). Time dependent transport of $LiBF_4$ was determined from its conductance. The initial linear region of the time dependent transport curves was used to calculate the permeability of RAPs (see Example 2 for details) and is reported in Table 4.

$LiBF_4$ showed a steep increase in concentration with time, indicating its faster transport across the separator compared to the monomer and RAPs. While permeability of $LiBF_4$ ($138.5 \times 10^{-12}$ m$^2$/s) is only 9 times higher than that of the small molecule monomer, it is ca. 70 times higher than that of high MW RAPs (FIG. 4b). For vanadium flow batteries, only 15 times higher selectivity was observed for proton permeation compared to vanadium with porous separators;

the porous separators were modified with silica to increase the proton selectivity to 50 times. Gratifyingly, for the high MW RAPs studied here, COTS porous separators show ca. 70 times higher selectivity for charge balancing ions ($Li^+$ $BF_4^-$) compared to RAPs. This observation clearly demonstrates the advantage of using RAPs, instead of small molecules, as charge storage materials for size-selective transport in porous separators. RAPs also showed negligible adsorption onto the COTS porous separators (Table 6).

TABLE 6

Weight percent of polymer adsorbed onto the membrane.

| | Initial amount of polymer in the bulk solution (mg) | Amount of polymer adsorbed (mg) | Weight percent of polymer adsorbed | Amount of polymer adsorbed per unit area (mg/cm$^2$) |
|---|---|---|---|---|
| 0.56 (Monomer) | 19.2 | 0.0015 | 0.0080 | 0.0079 |
| 21 | 20.1 | 0.0027 | 0.013 | 0.0138 |
| 318 | 20.1 | 0.0084 | 0.042 | 0.0428 |

We now turn to evaluate the impact of RAPs molecular weight on their transport properties across porous separators. For macromolecular transport across porous separators, the steric partition coefficient, i.e., the ratio of macromolecule concentration inside the pore and bulk solution, is known to play a key role in both size-exclusion chromatography and ultrafiltration. Steric partition coefficient depends on the relative macromolecular size as defined by the size ratio of the macromolecule relative to the pore size. Theoretical models for linear polymers predict a decrease in steric partition coefficient with increase in relative polymer size; only 20% of polymers can access the pore volume for a relative polymer size of 0.33 and polymers are completely size excluded from entering the pore for relative sizes >0.6. Other factors such as hindrance to polymer diffusion inside the pores as well as the polymer shape and charge can also influence the polymer transport across porous separators.

Figure 5:
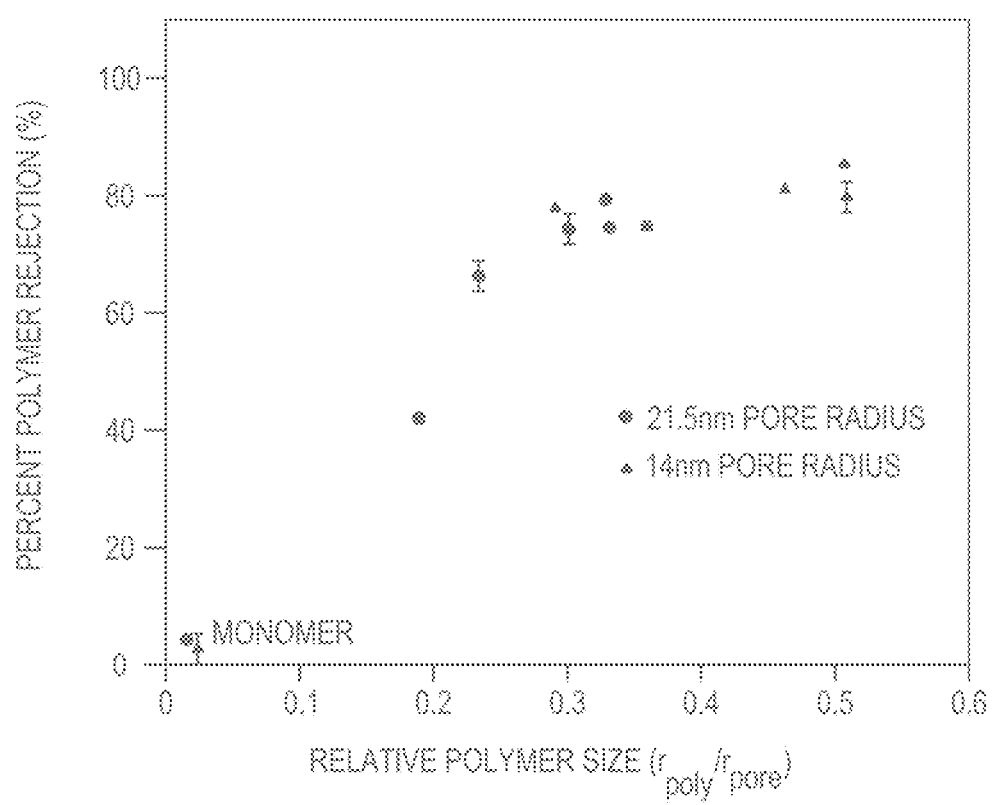
FIG. 5. Relative polymer size dependent polymer rejection across COTS porous separators for RAPs 1-5.
Figure 6:
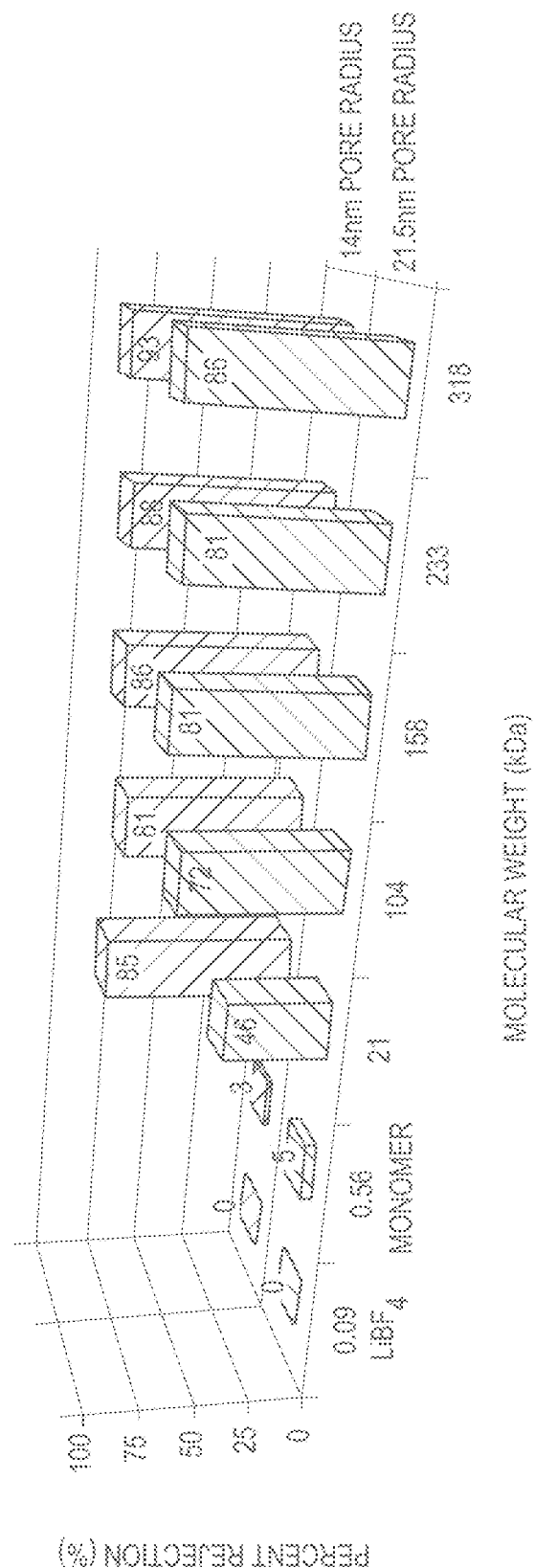
FIG. 6. Percent rejection of monomer and RAPs 1-5 across COTS porous separators.

Relative polymer size ($r_{poly}/r_{pore}$) dependent RAPs rejection across COTS separators is shown in FIGS. 5 and 6. Polymer size (solvodynamic radius) was determined using Stokes-Einstein equation (Table 7), and is shown in Table 4.

TABLE 7

Data used in the calculation of the solvodynamic radius for RAPs 1-5.

| Molecular weight (kDa) | Diffusion Coefficient (D) at 10$^{-2}$M (10$^{-10}$ m$^2$/s) | Viscosity (V) at 10$^{-2}$M (Pa · s) | Relative size ($D_m V_m/D_p V_p$) | Solvodynamic radius (Relative size * 0.35) nm |
|---|---|---|---|---|
| 0.56 | 13.9 | 0.009311 | 1 | 0.35 |
| 21 | 1.22 | 0.009060 | 12 | 4.1 |
| 104 | 0.95 | 0.009426 | 14 | 5.1 |
| 158 | 0.67 | 0.009451 | 20 | 7.2 |
| 233 | 0.73 | 0.009532 | 19 | 6.5 |
| 318 | 0.66 | 0.009636 | 20 | 7.1 | m = monomer,
p = polymer;
radius of the monomer (0.35 nm) was obtained from Spartan Polymer size increased with increasing molecular weight up to 158 kDa and no significant change was observed with further increase in molecular weight. Relative polymer size of the RAPs increased up to 0.33 and 0.50 for larger (Celgard® 2400 membrane, 21.5 nm pore radius) and smaller (Celgard® 2325 membrane, 14 nm pore radius) pore size membranes respectively. As can be seen from FIG. 5, the percent polymer rejection is seen to increase with increasing $r_{poly}/r_{pore}$. The percent polymer rejection increased rapidly until $r_{poly}/r_{pore\ of}$ 0.3 and then showed a gradual increase after that. The impact of relative polymer size on percent rejection is more apparent for 21 kDa (RAP 1) polymer. For larger pore radius membranes, RAP 1 showed only 46% rejection while for smaller pore radius membranes ca. 85% rejection is obtained. About 80% rejection is observed for all the RAPs as $r_{poly}/r_{pore}$ approaches 0.3, which is in close accordance with the theoretically expected steric exclusion for linear polymers across porous separators.

The loss of conformational freedom for polymers inside the pores even for the relative polymer sizes smaller than the pore size may be the main reason for the observed steric hindrance involved in the size-based separation of RAPs across COTS porous membranes. Among all the studied RAPs, the higher molecular weight polymer RAP 5 showed the highest percent polymer rejection (93%) across the smaller pore radius membrane. In the case of widely studied vanadium aqueous flow batteries with a Nafion® 115 membrane as the separator, there is 12% crossover of vanadium and the crossover increases depending on the cell operating conditions. Polymer crossover of as low as 7% (93% rejection) is achieved with the RAPs described here, which indicates that high Coulombic efficiency can be realized using RAPs in conjunction with porous separators in flow batteries.

Complete rejection of the polymers can be realized with RAPs or colloidal particles that have higher $r_{poly}/r_{pore}$ values (>0.6). However, based on the electrochemical studies, it is shown that higher molecular weight polymers have lower limiting current, as shown in FIG. 3. Thus, although high molecular weight RAPs offer higher rejection across the porous separators, there may be a trade-off in electrochemical properties such as limiting current. Other macromolecular architectures such as star, branched, cyclic polymers, and the colloidal particles described herein can also be used to vary the relative polymer size and obtain higher polymer rejection without adversely impeding their electrochemical properties. Given the low crossover observed for RAP 5, we tested its charge/discharge performance in a proxy setup for a non-aqueous flow cell. This consisted of two stirred electrolyte compartments with a Celgard® 2325 separator sandwiched between them. The open circuit voltage of the cell was 1.11±0.05 V (three different cells), which is in good agreement with the 1.27±0.05 V predicted from the initial state of charge of the RAP 5 solution and a metal oxide auxiliary electrode (Table 8).

TABLE 8

Summary of open circuit potentials (OCP) changes in charged NMC cathode ($LiNi_{0.33}Mn_{0.33}Co_{0.33}O_2$), anolyte (RAP 5), and combined flow cell system in 0.25M $LiBF_4$. Average OCP in flow cell was 1.11 ± 0.05 V. Predicted OCP based on summation of cathode and anode OCPs is 1.27 ± 0.05 V.

| OCP of charged metal oxide | OCP of electrolyzed RAP 5 solution | Predicted Open circuit voltage/V | Observed open circuit voltage in flow cell/V |
|---|---|---|---|
| 0.54 | −0.78 | 1.32 | 1.17 |
| 0.43 | −0.81 | 1.24 | 1.07 |
| 0.41 | −0.83 | 1.24 | 1.09 |

Figure 10:
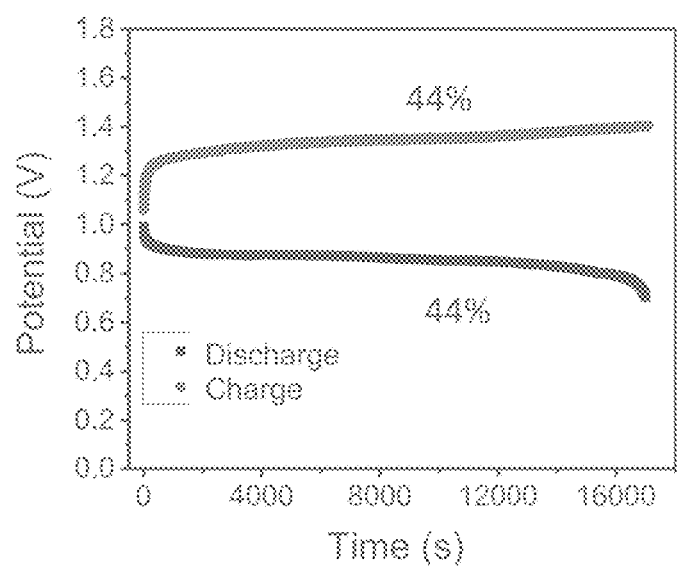
FIG. 10. First discharge-charge properties of 10 mM RAP 5 in proxy flow cell system with NMC as cathode and Celgard 2325 as separator. Discharge capacity 44.0%, charge capacity 44.2%.

Electrolytic conductivity through the Celgard® separator allowed the charge/discharge of this cell in LiBF$_4$ electrolyte as shown in FIG. 10, where stable operation over multiple cycles was observed at C/10 rate. The resulting curves displayed one monotonic and well-defined plateau on the first cycles, corresponding to the conversion of the viologen +/2+ redox pair, and stable operation in subsequent cycles. Furthermore, FIG. 11 and Table 9 show that the Celgard® separator retained its mechanical integrity and that the low crossover observed in the diffusion cell studies was maintained during prolonged periods of operation even for mixed solutions of viologen +/2+ (cathode part cell remained clear and free of color from viologen polymers).

TABLE 9

RAP cross-over ratios after operation of flow cell during at least 18 h. Representative results for RAP 1 and RAP 5.

| Sample | RAPs concentration ratio of anode side over cathode side | RAPs Crossover (%) |
|---|---|---|
| RAP 1 | 5.7 | 15 |
| RAP 5 - test 1 | 30.4 | 3 |
| RAP 5 - test 2 | 42.9 | 2 |

This preliminary evaluation highlights the potential for using the size-selective strategy enabled by COTS and RAP electrolytes in a practical redox flow cell. We showed that this leads to an operating cell with substantially decreased redox active component crossover.

Conclusions.

We have shown that size-based selective transport of supporting electrolyte (Li$^+$BF$_4^-$) across COTS porous separators is attainable by controlling the size of the charge storage material. Viologen-based redox active polymers RAP 1-5 of molecular weight between 21-318 kDa were synthesized to vary the size of the charge storage material. The molecular weight dependent RAPs electrochemical properties and transport across porous separators were studied. Although transient voltammetry showed the presence of multilayer RAP adsorption on Pt electrodes from low concentration solutions of RAPs 1-5 (10 mM), ultra-microelectrode voltammetry revealed facile electron transfer with E½~0.7 V vs. Ag/Ag$^+$ for the viologen 2+/+ reduction at concentrations as high as 1.0 M in acetonitrile. Controlled potential bulk electrolysis indicates that 94-99% of the nominal charge on different RAPs is accessible and the electrolysis products are stable upon cycling. While at high concentration the limiting current of RAPs in solution is decreased due to a concurrent increase in solution viscosity, RAPs 1-5 preserve most of the desirable electrochemical properties of the originating viologen-based monomer such as high solubility, similar redox potential, and their electrochemical and chemical reversibility. This makes them suitable candidates for low potential species in NRFBs.

Selectivity for Li$^+$BF$_4^-$ transport across COTS porous separators increased significantly by changing the charge storage material from small molecule monomer (9 times) to redox active polymers (ca. 70 times). The percent polymer rejection across the COTS separator increased with increase in RAP molecular weight, as well as reduction in pore size. Polymer crossover of as low as 7% (93% rejection) was achieved with the RAPs studied here.

Our systematic studies show a complex relationship between polymer molecular weight and electrochemical, rheological and transport properties. Nonetheless, they establish the feasibility of the size-selective separator approach aided by redox active polymers to explore new prospects in NRFBs. We preliminarily showed that this combination of elements can lead to an operating cell with adequate performance and substantially decreased redox active component crossover. We are currently evaluating other highly soluble redox active components as well as other macromolecular architectures such as star, branched, cyclic polymers, and colloidal particles that can be used for tuning polymer size, transport and electrochemical properties for enhanced NRFB performance.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Abbreviations: RAP, redox active polymer; UME, ultra-micro electrode; CV, cyclic voltammetry; BE, Bulk Electrolysis; COTS, commercial off-the-shelf; NRFB, non-aqueous redox flow battery.

Air or moisture-sensitive manipulations were performed under nitrogen atmosphere using standard Schlenk techniques. Glassware was oven-dried prior to use. Unless otherwise stated, starting materials and reagents were purchased from Sigma-Aldrich or Matrix Scientific and used without further purification. Poly(vinylbenzyl chloride) (over 90% are 4 substituted) of different molecular weights (5.3, 60, and 82 kDa) were purchased from Polymer Source. Poly(vinylbenzyl chloride) of molecular weights 27 and 41 kDa were synthesized using Reversible Addition-Fragmentation Chain-Transfer (RAFT) Polymerization. Dimethyl formamide (DMF) was obtained from a Solvent Delivery System (SDS) equipped with activated neutral alumna columns under argon.

$^1$H and $^{13}$C NMR spectra were recorded on Varian Unity 500, and VXR 500 spectrometers. Chemical shifts are reported in δ (ppm) relative to the residual solvent peak ((CD$_3$)$_2$SO: 2.50, (CD$_3$)$_2$CO: 2.05 for $^1$H; (CD$_3$)$_2$CO: 29.84 for $^{13}$C). Low and high resolution EI mass spectra were recorded on a Micromass 70-VSE spectrometer. Infrared spectra (percent transmittance) were acquired on a Nicolet Nexus 670 FT-IR spectrometer with an ATR-IR attachment. UV-Vis absorption spectra were recorded on Perkin Elmer and Shimadzu instruments. Dynamic light scattering was recorded on NICOMP zetasizer. Elemental analyses were performed on the following instruments: CHN analysis—Exeter Analytical CE 440 and Perkin Elmer 2440, Series II; ICP analysis—ICP-MS and ICP-OES; Halide analysis—Titration & ISE. Analytical gel permeation chromatography (GPC) analyses were performed on a system composed of a Waters 515 HPLC pump, a Thermoseparations Trace series AS100 autosampler, a series of three Waters HR Styragel columns (7.8' 300 mm, HR3, HR4, and HR5), and a Viscotek TDA Model 300 triple detector array, in HPLC grade THF (flow rate=1.0 mL/min) at 30° C. The GPC was calibrated using a series of monodisperse polystyrene standards.

Viscosity was measured on a TA Instrument AR-G2 rheometer. Flow cell UV-Vis experiments were performed using Masterflex L/S Digital Economy Drive Model 7524-40 pump and a Masterflex EW-77390-0 PTFE-Tubing Pump Head with spectroscopy grade acetonitrile (flow rate =1.0 mL/min). Conductance of LiBF$_4$ was measured on YSI Model 35 Conductance Meter with BASi MW-4130 platinum wire auxiliary electrodes.

Example 1. Synthesis of Redox Active Monomer and Polymers

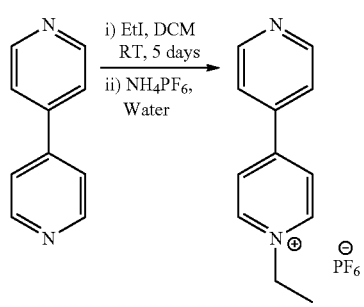

(1)

Ethyl Viologen Hexafluoro Phosphate (1):

1 was synthesized following the reported procedure (Heinen, S.; Walder, L. *Angew. Chem. Int. Ed.* 2000, 39, 806-809). $^1$H NMR ((CD$_3$)$_2$SO): δ=9.24 (d, J=10 Hz, 2H), 8.87 (dd, J=5 Hz, 2H), 8.63 (d, J=10 Hz, 2H), 8.02 (dd, J=5 Hz, 2H), 4.65 (q, J=5 Hz, 2H), 1.58 (t, J=7.5 Hz, 3H). HRMS (EI+) calculated for C12H13F6N2P (M)$^+$ 330.07, C12H13N2 (M-PF$_6$)$^+$ 185.11; Found (M-PF$_6$)$^+$ 185.11.

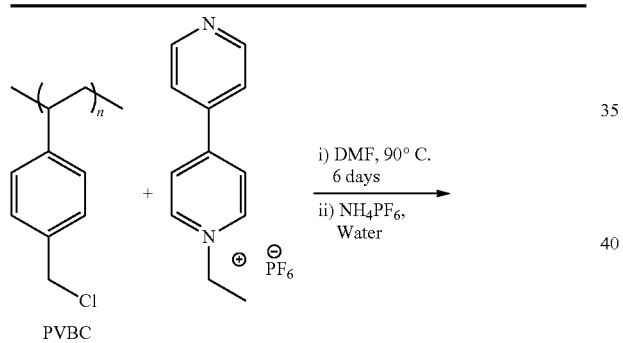

| PVBC Mn (kDa) | PDI | RAP Mn (kDa) |
|---|---|---|
| 5.3 | 1.9 | 21 |
| 27 | 1.9 | 104 |
| 41 | 1.6 | 158 |
| 60 | 1.9 | 233 |
| 82 | 1.6 | 318 |

DP$_{PVBC}$ = Mn$_{PVBC}$/152.62 Da
Mn$_{RAP}$ = DP$_{PVBC}$ × 592.35 Da

Redox Active Polymers (RAPs 1-5):

Dry DMF (15 mL) was added to a flask containing PVBC (500 mg, 3.27 mmol) and 1 (5.4 g, 16.38 mmol) under nitrogen. The reaction mixture was stirred at 90° C. for 6 days. Concentrated solution of ammonium hexafluoro phosphate (5 g) solution was prepared in water and added to the above reaction mixture. The resultant solution was stirred at room temperature for 12 h and precipitated in methanol. Collected polymer was redissolved in acetonitrile and reprecipitated in diethyl ether. Polymers were dried under high vacuum for 24 h. $^1$H NMR were recorded in (CD$_3$)$_2$CO.

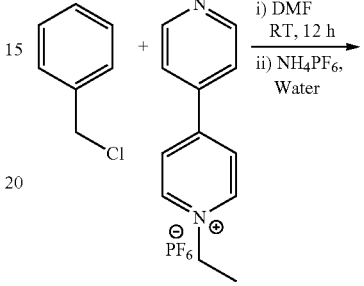

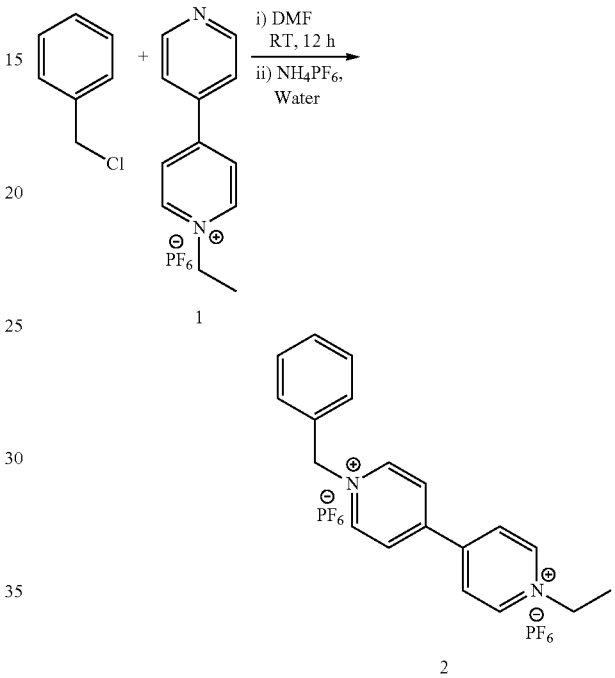

Benzyl-Ethyl Viologen Dihexafluorophosphate (2):

Dry DMF (8 mL) was added to a flask containing benzyl chloride (1.10 g, 8.76 mmol) and 1 (2.0 g, 6.06 mmol) under nitrogen. The reaction mixture was stirred at room temperature for 12 h. The solution changed from transparent red to cloudy red. Concentrated solution of ammonium hexafluoro phosphate (1.98 g) was prepared in water and added to the above reaction mixture. The resultant solution was stirred at room temperature for 4 h. The precipitated product was filtered and dried under high vacuum for 24 h to yield the product as a pale yellow powder (2.89 g 84.3%). $^1$H NMR ((CD$_3$)$_2$CO): δ=9.53 (d, J=5 Hz, 2H), 9.45 (d, J=5 Hz, 2H), 8.84 (m, 4H), 7.69 (m, 2H), 7.52 (m, 3H), 6.19 (s, 2H), 5.01 (q, J=5 Hz, 2H), 1.8 (t, J=7.5 Hz, 3H). HRMS (ES+) calculated for C$_{19}$H$_{20}$F$_{12}$N$_2$P$_2$ (M)$^+$566.09, C$_{19}$H$_{20}$F$_6$N$_2$P (M-PF$_6$)$^+$421.13; Found (M-PF$_6$)$^+$421.1265.

Example 2. Characterization of Redox-Active Polymers and NRFBs

Polymer rejection and permeability through a separator can be calculated using the equations described by Mai et al. (*J. Power Sources* 2011, 196, 482-487). For example, Percent Rejection across membrane (%)=$[1-(2C_f/C_i)] \times 100$ where $C_f$=concentration in the receiver compartment after 24 hours; and $C_i$=initial concentration in the donor compartment; and Permeability=$V_B \times L \times (dC_B/dt)/(A \times (C_A - C_B(t)))$ where P=Permeability; $dC_B(t)/dt$=Slope from the linear region of concentration vs. time plot; $C_A$=initial concentration in donor compartment; $V_B$=solution volume in the receiver compartment; A=Area of orifice; L=Thickness of the separator (e.g., a Celgard 2325 separator); and $C_B$(t)=time dependent polymer concentration in the receiver compartment.

RAPs Adsorption onto Membranes.

Two types of experiments were carried out to test the adsorption of RAPs on to the membrane. In the first experiment, the membrane used for the transport measurements was rinsed with acetonitrile and soaked in acetonitrile for 6 hours to dissolve any polymer adsorbed on to the membrane into the solution. The absorption spectrum of the resultant solution was recorded to determine the amount of polymer adsorbed on to the membrane. Negligible amount of polymer adsorption (~0.05%) is observed even for the highest molecular weight RAP and the adsorption is even low (<0.02%) for the monomer and the lowest molecular weight RAP.

In the second experiment, the membrane was soaked in 0.01M, the concentration at which the transport measurements was carried out, polymer solution for 24 h. Percent polymer adsorption was determined by recording the UV-Vis absorption spectrum of the solution before and after soaking the membrane. Negligible amount of polymer adsorption was observed, which corroborates well with the results from the first experiment. See Table 6.

Charge/Discharge Behavior in a Proxy Non-Aqueous Redox Flow Cell Configuration.

Figure 11:
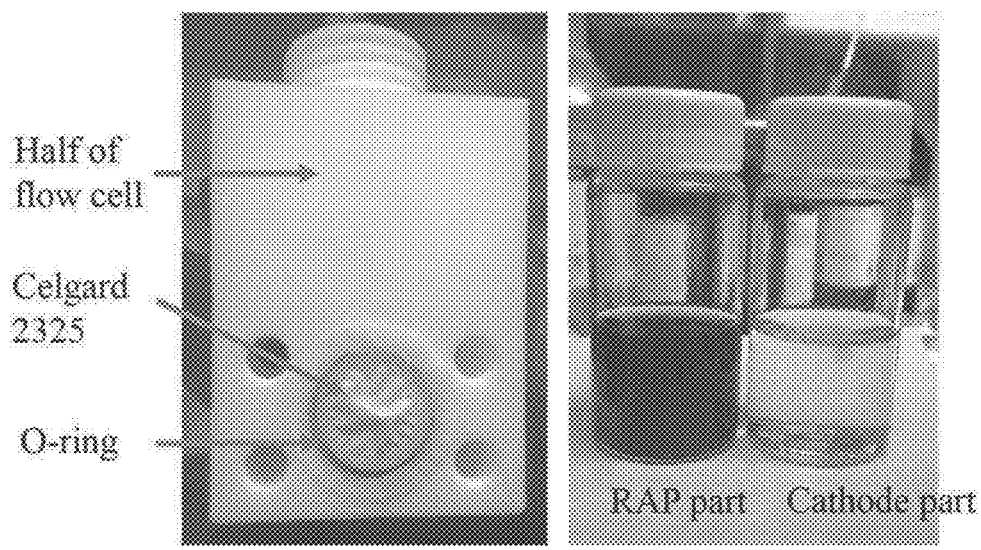
FIG. 11. Membrane and electrolytes after prolonged redox flow cell operation. Left: Celgard separator shows mechanical stability during setup and prolonged use as well as little evidence of RAP adsorption. Right: RAP compartment solution (on the left) and NMC compartment solution (on the right) confirm that crossover was limited between these two compartments.

Electrochemical Cell:

We used a home-built two-chamber Teflon cell where the Celgard separator was sandwiched between the two electrolyte receptacles and making a tight seal using o-rings (see FIG. 11). The solution containers were stirred using similar settings to those used in the bulk electrolysis experiments (see FIG. 2 and description thereof). The electrolyte used in these experiments was 0.25 M $LiBF_4$ in acetonitrile. The first chamber contained 10 mM RAP and used an immersed Pt mesh electrode as the working electrode. The auxiliary electrode compartment used a commercial $LiNi_{0.33}Mn_{0.33}Co_{0.33}O_2$ electrode (NMC) from Sigma-Aldrich. This electrode was supported on an Al current collector.

Both the RAP solution and the NMC electrode were charged in separate experiments previous to use in the electrochemical cell: the RAP solution was electrolyzed following the procedure used for collection of FIG. 2 data and the NMC electrode was charged to a capacity at least two times that of the nominal RAP charge but within stable limits for the metal oxide. Experiments were performed in galvanostatic mode. We experimentally determined that a C rate of 1/10 was adequate for this system. For the ~7.7 C of species used in the RAP compartment, this corresponded to 0.2 mA of current passed. The cell was not charge/discharged to completion, in order to avoid unwanted reactions, however, a charge capacity of 44% was observed under these conditions.

Results:

All experiments were conducted in Ar-filled drybox with low traces of water and oxygen. The open circuit voltage of the cell approximated very well the predicted value calculated based on the state of charge of each individual electrode/compartment as shown in Table 8. FIG. 10 shows that the cell showed stable charge and discharge with a single plateau during the first cycle. Because the voltage limits were constrained to a narrow range in order to prevent the second viologen reduction process or decomposition of the cathode, we observed approximately a ~45% Coulombic efficiency for this system.

Upon multiple cycles, a stable profile was obtained, however a decrease in the absolute charge passed on the system was observed. Electrolyte samples from each compartment were obtained after the end of each run, typically after operating for more than 18 h. These samples were analyzed through UV-Vis (Table 1) to compare the crossover of RAP. Visually, FIG. 11 shows that the RAP compartment (left cell) displayed a vivid purple color due to the presence of viologen species, but the auxiliary electrode compartment showed a much lower (and non-visible) viologen concentration. Table 9 shows the ratio of viologen concentration in the RAP compartment to that of the auxiliary electrode compartment for selected RAP 5 and RAP 1 experiments. These numbers are in good agreement with the trends observed in the diffusion cell experiments discussed above; see FIG. 5. FIG. 11 also shows that the Celgard® separator showed excellent mechanical stability in the used setup and after hours of continuous stirred operation. As a simple confirmation of the data shown in Table 6, few RAP residues where observed to remain on the membrane.

Example 3 Preparation and Characterization of Redox-Active Colloidal Particles

Figure 14:
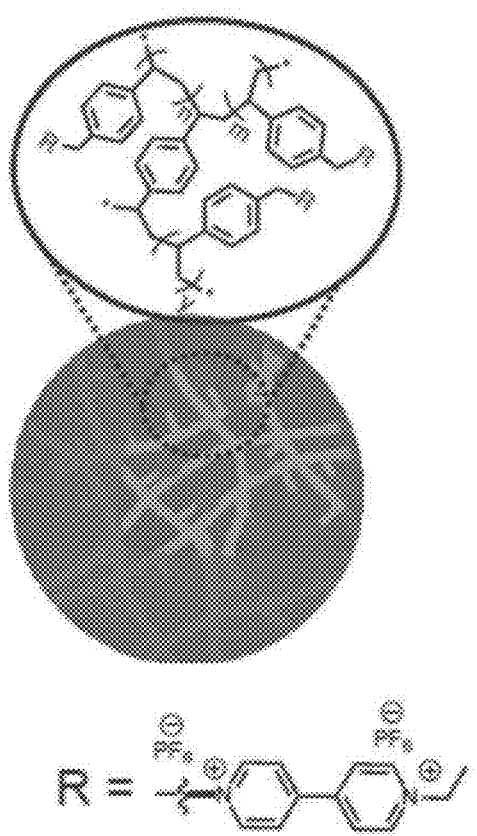
FIG. 14. A schematic of the colloidal particles, where m, n, x, and/or y are sufficient values to provide the crosslinked polymers having average diameters of about 50 nm to about 3000 nm, as determined by SEM analysis. Average molecular weights ($M_n$) of the particles can be about 0.5 million to about 10 million kDa, or about 1 million to about 5 million kDa.

Redox-active colloidal particles were prepared and evaluated as redox species for NRFBs. A schematic of the colloidal particles is shown in FIG. 14.

Polyvinylbenzyl Chloride Particles (60 nm and 90 nm):

The redox-initiated emulsion polymerization of 4-vinylbenzyl chloride reported by Chonde and coworkers (J. Appl. Polym. Sci. 1980, 25, 2407) was modified to synthesize poly(4-vinylbenzyl chloride) (PVBC) particles 60±10 and 90±10 nm in diameter. Reagent quantities are listed in Table 3-1.

TABLE 3-1

Recipes for 60-nm and 90-nm PCMS particles.

| Reagent | 60-nm Recipe | 90-nm Recipe |
|---|---|---|
| Water (mL) | 21.0 | 14.0 |
| 10% (w/w) Triton X-100 (mL) | 16.0 | 16.0 |
| 1.0% (w/w) Sodium dodecyl sulfate (mL) | 16.0 | 16.0 |
| 0.1N KOH (mL) | 12.0 | 12.0 |
| 0.01% (w/w) $FeSO_4 \cdot 7H_2O$ (mL) | 1.0 | 2.0 |
| 4-Vinylbenzyl chloride, 90% (mL) | 15.0 | 30.0 |
| Divinylbenzene, 80% (mL) | 0.30 | 0.60 |
| 1.0% (w/w) $NaHSO_3$ (mL) | 4.0 | 8.0 |
| 3.0% (w/w) $K_2S_2O_8$ (mL) | 2.0 | 4.0 |
| Nitromethane (mL) | 0.02 | 0.02 |

Larger or smaller particles can be prepared based on proportional variations of these components and quantities.

A 200-mL Morton flask fitted to a mechanical stirrer was charged with water, Triton X-100 solution, SDS solution, and KOH solution. Nitrogen was bubbled through the mixture for 15 min, and the mixture was heated to 30° C. After addition of 4-vinylbenzyl chloride and divinylbenzene, the mixture was stirred ~330 rpm for 1 h. The initiator solutions and nitromethane were then added, and the stir rate was reduced to ~150 rpm. Turbidity was observed within 15 min. After 12 h, the reaction mixture was dialyzed against a 2.0%

(w/v) solution of Triton X-100 in THF. The solution was replaced 4 times in 24 h. Particle diameter and standard deviation were obtained from SEM images using ImageJ software and averaging 50 particles.

Polyvinylbenzyl Chloride Particles (750 nm):

The dispersion polymerization procedure reported by Margel and coworkers (*J. Poly. Sci. Part A* 1991, 29, 347) was modified to yield PVBC particles 0.75±0.08 μm in diameter. In a 200-mL Morton flask fitted to a mechanical stirrer, polyvinylpyrrolidone (1.15 g, average molecular weight 40 kDa) was dissolved in 200-proof EtOH (95 mL). The solution was stirred at ~165 rpm and sparged with nitrogen for 15 min before being heated to 70° C. AIBN (0.10 g) was dissolved in 4-vinylbenzyl chloride (4.9 mL, 90%) and divinylbenzene (0.10 mL, 80%); this solution was added to the stirring, heated mixture. After 12 h, the mixture was centrifuged; and the supernatant was decanted. The particles were functionalized in the next step without purification or drying. Particle diameter and standard deviation were obtained from SEM images using ImageJ software and averaging 50 particles.

Viologen Redox Active Colloidal Particles (RACs 1-3):

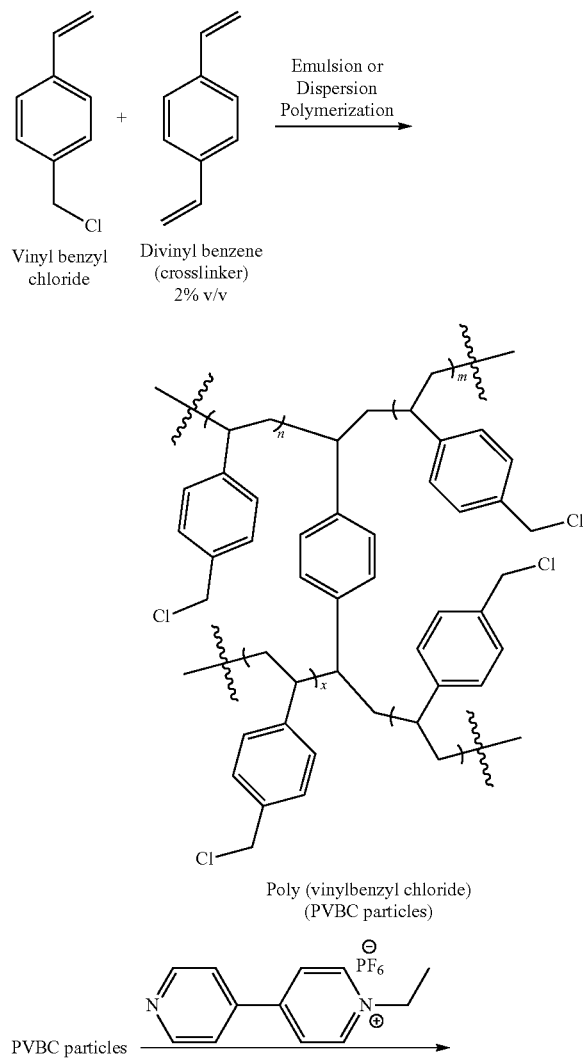

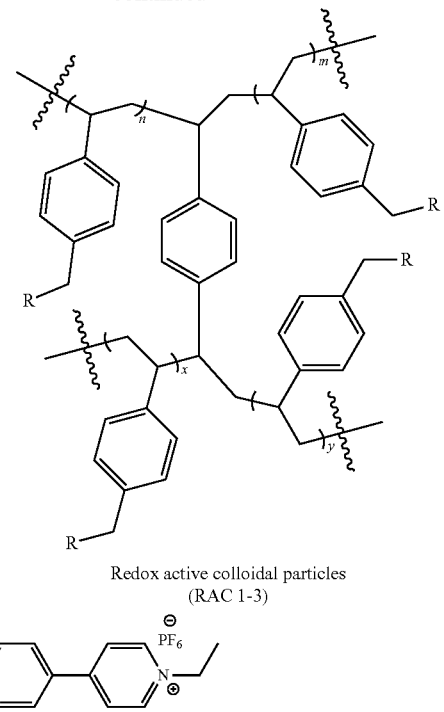

Similar techniques can be used to prepare redox active colloidal particles based on polyacrylate, polymethacrylate, polystyrene, polynorbornene, and polyacrylamide polymer backbones.

Dry DMF (45 mL) and dry THF (45 mL) were added to a flask containing polyvinylbenzyl chloride colloidal particles (1.5 g, 3.27 mmol) and the resultant mixture was sonicated in a bath sonicator until a homogeneous dispersion was obtained (~1-2 h). To the above dispersion ethyl viologen (15 g, 48.0 mmol) was added and reflux condenser was attached. Reflux condenser was sealed with rubber septa at the top. The dispersion was subjected to 3 vacuum/nitrogen cycles followed by purging with nitrogen for about 15 min. The round-bottom flask was then immersed in an oil bath, preheated to 90° C., for 7 days. A concentrated solution of ammonium hexafluoro phosphate (15 g in 30 mL water) solution was prepared and added to the above reaction mixture. To the resultant solution mixture of DMF and acetonitrile (40 mL) was added and stirred at room temperature for 2 days. Water was added to the above solution until a precipitate was observed. The product was separated by centrifuging the mixture. To the obtained product methanol was added, centrifuged (50 mL centrifuge tubes) and the supernatant was decanted. This process was repeated for 3 times with methanol and 2 times with ether. The resultant product was dried under high vacuum for 2 days. RAC 1-3 are peach puff to light salmon color.

Figure 15:
FIG. 15. SEM image of RACs 1-3. The numbers in the images (80 nm, 135 nm, and 827 nm) indicate the average diameter of the RACs. Scale bars=500 nm.

SEM images are RAC 1-3 are shown in FIG. 15. Table 3-2 shows the average particles sizes. Table 3-3 shows the RAPs and RACs redox species crossover data across a Celgard® 2325 porous membrane separator (28 nm pore size) in acetonitrile at 0.01 M.

TABLE 3-2

Particle size as determined by dynamic light scattering (DLS). Sample concentration: 1 mg/mL in 9 mM LiBF$_4$ acetonitrile.

| Sample | RACs Size by DLS (nm) |
|---|---|
| RAC 1 - 80 nm | 172 |
| RAC 2 - 135 nm | 233 |
| RAC 3 - 827 nm | 1372 |

TABLE 3-3

RAP and RAC redox species 24-hour crossover data across a Celgard ® 2325 membrane (28 nm pore size).

| Redox active material | | Redox active material crossover |
|---|---|---|
| | MW (Mn) kDa | |
| Viologen Monomer | 0.56 | 97 |
| RAP-1 | 21 | 15 |
| RAP-2 | 104 | 19 |
| RAP-3 | 158 | 14 |
| RAP-4 | 233 | 12 |
| RAP-5 | 318 | 7 |
| | Size Diameter (nm) | |
| RAC-1 | 80 | <0.05% |
| RAC-2 | 135 | |
| RAC-3 | 827 | |

The rRACs can be dispersed up to about 40 wt % in acetonitrile (corresponding to about 0.65 M in acetonitrile). The RACs were determined to be effective redox species in a NRFB and crossover was significantly reduced compared to RAPs.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A redox flow battery comprising first and second chambers separated by a microporous or nanoporous size-exclusion membrane, wherein the first and second chambers each contain a non-aqueous solvent, a charge balancing ion, and an electrode;
wherein the first chamber contains a redox-active viologen-based polymer having a molecular weight of at least about 10 kDa dissolved in the non-aqueous solvent, and wherein the $r_{poly}/r_{pore}$ (polymer solvodynamic size relative to separator pore size) values are >0.3.

2. The flow battery of claim 1 wherein the first chamber further contains a redox active viologen-based polymeric particle prepared from polyvinylbenzyl chloride crosslinked with divinyl benzene, wherein greater than 80% of the chloride groups of the polyvinylbenzyl chloride have been displaced with an alkyl viologen, and wherein the polymeric particle has an average diameter of at least about 20 nm.

3. The flow battery of claim 2 wherein the polymeric particle is in a colloidal emulsion, suspension or dispersion in the first chamber.

4. The flow battery of claim 3 wherein the polymeric particle has a diameter of about 50 nm to about 200 nm.

5. The flow battery of claim 3 wherein the polymeric particle has a diameter of about 500 nm to about 1000 nm.

6. The flow battery of claim 3 wherein the crossover of the redox active polymeric particle is less than 0.05%.

7. The flow battery of claim 2 wherein the viologen-based polymeric particle is prepared by an emulsion, suspension or dispersion polymerization of 4-vinylbenzyl chloride and divinylbenzene, wherein the 4-vinylbenzyl chloride is present in excess of the divinylbenzene by about 20 to 100 fold, followed by contacting the resulting particle with an alkyl viologen, under conditions and for a period of time sufficient to allow the alkyl viologen to react with the particle, followed by isolation of the particle.

8. The flow battery of claim 1 wherein the charge balancing ion comprises $Li^+$, $Na^+$, $K^+$, $Mg^{+2}$, $Ca^{+2}$, or $NH_4^+$, or $NR_4^+$ wherein each R is independently H, alkyl, aryl, or pyridinium.

9. The flow battery of claim 1 wherein the first and second chambers contain an electrolyte solution comprising anions selected from the group consisting of $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2+}$, $B_{12}X_6H_{(12-n)}^{2-}$, and $X^-$, wherein X is a halogen.

10. The flow battery of claim 1 wherein the non-aqueous solvent is acetonitrile, ethylene carbonate, propylene carbonate, butylene carbonate, dimethyl carbonate, diethyl carbonate, dipropyl carbonate, ethyl methyl carbonate, fluoroethylene carbonate, gamma-butyrolactone, N-methyl-2-pyrrolidone, N,N-dimethylformamide, N,N-dimethylacetamide, dimethylsulfoxide, dichloromethane, chloroform, benzene, toluene, xylene, chlorobenzene, nitrobenzene, methyl acetate, ethyl acetate, acetone, methyl ethyl ketone, cyclohexanone, diethyl ether, 1,2-dimethoxyethane, tetraethylene glycol dimethyl ether, bis(2-methoxyethyl) ether, tetrahydrofuran, 1,4-dioxane, methanol, ethanol, or a combination of two or more of the foregoing solvents.

11. The flow battery of claim 1 wherein the pores of the size-exclusion membrane are about 10 nm in diameter to about 1000 nm in diameter.

12. The flow battery of claim 1 wherein the pores of the size-exclusion membrane are about 20 nm in diameter to about 50 nm in diameter.

13. The flow battery of claim 1 wherein greater than 93% of the nominal viologen loading on the viologen-based polymer is accessed electrochemically, as determined by bulk electrolysis.

14. A redox flow battery comprising first and second chambers separated by a microporous or nanoporous size-exclusion membrane, wherein the first and second chambers each contain a non-aqueous solvent, a charge balancing ion, and an electrode; wherein the first chamber contains a redox-active viologen-based polymer having a molecular weight of at least about 10 kDa dissolved in the non-aqueous solvent, and the viologen-based polymer is a polymer of Formula I:

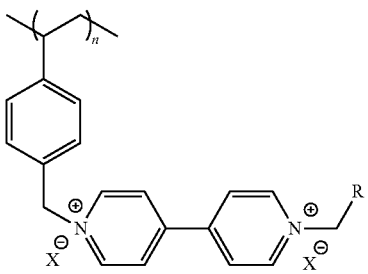

(I)

wherein
  each $X^-$ is a suitable anion;
  R is H, alkyl, alkyl(aryl), or alkyl-alkoxy; and
  n is sufficient to provide a polymer wherein n is such that the molecular weight ($M_n$) of the polymer is about 10 kDa to about 500 kDa.

15. The flow battery of claim 14 wherein the molecular weight ($M_n$) of the polymer is about 15 kDa to about 350 kDa.

16. The flow battery of claim 14 wherein the viologen-based polymer is dissolved in the non-aqueous solvent to a concentration of greater than 1M.

17. The flow battery of claim 14 wherein the crossover of the redox active polymer is less than 20%.

18. The flow battery of claim 17 wherein the crossover of the redox active polymer is less than 10%.

19. A non-aqueous redox flow battery comprising: a positive electrolyte; a negative redox active species; and a size exclusion membrane separator, the size exclusion membrane being disposed between the positive electrolyte and the negative redox active species, wherein the redox active species is comprises a polymer of Formula I:

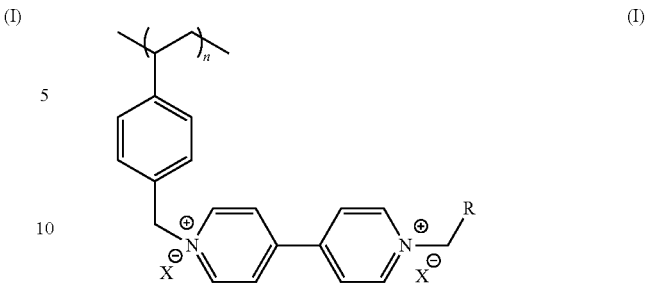

(I)

wherein
  each $X^-$ is a suitable anion;
  R is H, alkyl, alkyl(aryl), or alkyl-alkoxy; and
  n is sufficient to provide a polymer wherein n is such that the molecular weight ($M_n$) of the polymer is about 10 kDa to about 500 kDa.

20. A redox flow battery comprising first and second chambers separated by a microporous or nanoporous size-exclusion membrane, wherein the first and second chambers each contain a non-aqueous solvent, a charge balancing ion, and an electrode; wherein the first chamber contains a redox-active viologen-based polymer having a molecular weight of at least about 10 kDa dissolved in the non-aqueous solvent, and the viologen-based polymer has a backbone comprising polyvinylbenzene, polyacrylate, polymethacrylate, polystyrene, polyalkylene glycol or polyvinyl ether.

21. The flow battery of claim 20 wherein the charge balancing ion comprises $Li^+$, $Na^+$, $K^+$, $Mg^{+2}$, $Ca^{+2}$, or $NH_4^+$, or $NR_4^+$ wherein each R is independently H, alkyl, aryl, or pyridinium.

22. The flow battery of claim 20 wherein the first and second chambers contain an electrolyte solution comprising anions selected from the group consisting of $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, $B_{12}X_6H_{(12-n)}^{2-}$, and $X^-$, wherein X is a halogen.

* * * * *

UNITED STATES PATENT AND TRADEMARK OFFICE
CERTIFICATE OF CORRECTION

PATENT NO. : 9,982,068 B2  
APPLICATION NO. : 15/000910  
DATED : May 29, 2018  
INVENTOR(S) : Gavvalapalli et al.

Page 1 of 1

It is certified that error appears in the above-identified patent and that said Letters Patent is hereby corrected as shown below:

In the Claims

- In Claim 9, Column 34, Line 34, please delete "$B(C_2O_4)^{2+}$" and insert -- $B(C_2O_4)^{2-}$ -- therefor.

- In Claim 19, Column 35, Line 38, please delete "species is comprises" and insert -- species comprises -- therefor.

- In Claim 21, Column 36, Line 30, please delete "Lit" and insert -- $Li^+$ -- therefor.

Signed and Sealed this  
Tenth Day of July, 2018

Andrei Iancu  
*Director of the United States Patent and Trademark Office*